(12) United States Patent
Kumar et al.

(10) Patent No.: US 8,466,253 B1
(45) Date of Patent: Jun. 18, 2013

(54) POLY(PHENYLENE ETHER) PROCESS

(75) Inventors: Prashant Kumar, Troy, NY (US);
Alvaro Carrillo, Delmar, NY (US);
Scott Michael Fisher, Delmar, NY (US); Nitin Vilas Tople, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/538,020

(22) Filed: Jun. 29, 2012

(51) Int. Cl.
*C08G 64/00* (2006.01)
*C08G 63/02* (2006.01)

(52) U.S. Cl.
USPC ............ 528/193; 528/190; 528/201; 528/496

(58) Field of Classification Search
USPC .................................. 528/190, 193, 201, 496
See application file for complete search history.

(56) References Cited

U.S. PATENT DOCUMENTS

| | | |
|---|---|---|
| 2,622,797 A | 2/1950 | Hemfort |
| 3,838,102 A | 9/1974 | Bennett et al. |
| 4,157,434 A | 6/1979 | Floryan et al. |
| 4,237,265 A | 12/1980 | Eliassen et al. |
| 4,436,870 A | 3/1984 | Hinselmann et al. |
| 4,482,705 A | 11/1984 | Hambrecht et al. |
| 4,614,598 A | 9/1986 | Zettier et al. |
| 4,654,418 A | 3/1987 | Berger et al. |
| 4,755,165 A | 7/1988 | Gunnewig |
| 6,332,987 B1 | 12/2001 | Whitney et al. |
| 6,576,738 B2 | 6/2003 | Braat et al. |
| 6,897,282 B2 | 5/2005 | Freshour et al. |
| 6,962,965 B2 | 11/2005 | Yeager |
| 7,329,708 B2 | 2/2008 | Birsak et al. |
| 7,595,367 B2 | 9/2009 | Carrillo et al. |
| 2005/0049362 A1 | 3/2005 | Buckley et al. |
| 2005/0178718 A1 | 8/2005 | Geibel et al. |
| 2007/0299243 A1 | 12/2007 | Delsman et al. |
| 2008/0051522 A1 | 2/2008 | Birsak et al. |
| 2008/0246173 A1 | 10/2008 | Braidwood et al. |
| 2009/0211967 A1 | 8/2009 | Delsman et al. |

FOREIGN PATENT DOCUMENTS

| | | |
|---|---|---|
| GB | 884768 | 12/1961 |
| KR | 10-1996-0004115 B1 | 3/1996 |

OTHER PUBLICATIONS

U.S. Appl. No. 13/417,451, filed Mar. 12, 2012,; Bates, et al.; "Poly(Phenylene Ether) Process"; (unpublished).
International Search Report and Written Opinion; International Appliction No. PCT/US20121069385; International Filing Date Dec. 13, 2012; Date of Mailing Mar. 26, 2013; Agent's File Reference P020429PCT; 6 pages.

*Primary Examiner* — Terressa Boykin
(74) *Attorney, Agent, or Firm* — Cantor Colburn LLP

(57) ABSTRACT

A method of purifying a capped poly(phenylene ether) includes mixing a poly(phenylene ether) capping reaction mixture comprising a capped poly(phenylene ether), a capping agent, a capping byproduct, a capping catalyst, and a poly(phenylene ether) solvent, and first washing solvents comprising a C1-C4 alkanol and water to form a first liquid phase comprising the capped poly(phenylene ether) and poly(phenylene ether) solvent, and a second liquid phase comprising C1-C4 alkanol and water; and separating the first liquid phase from the second liquid phase. Capped poly(phenylene ether) having reduced levels of residual capping agent, capping byproduct, and capping catalyst is produced from poly(phenylene ether) capping reaction mixtures by this method.

20 Claims, 1 Drawing Sheet

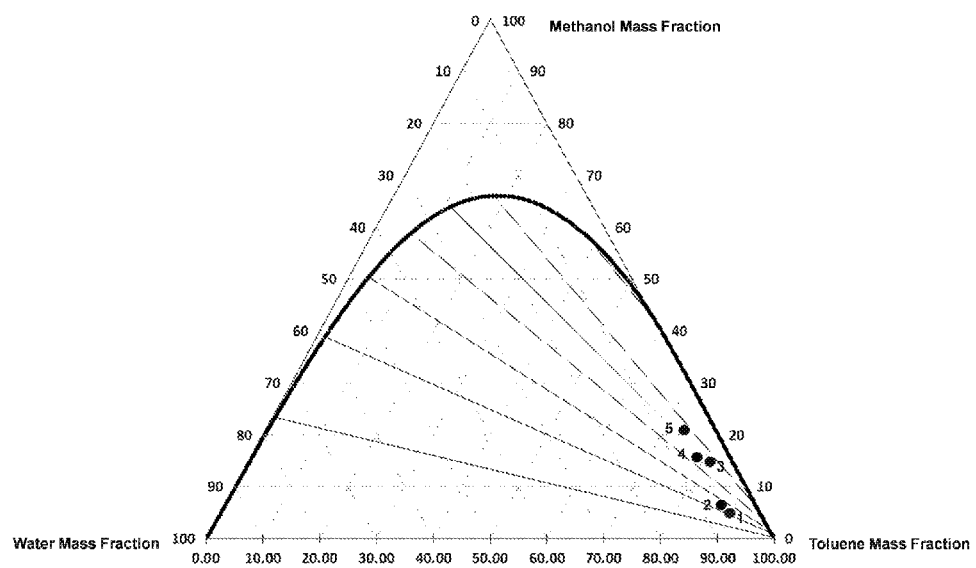

POLY(PHENYLENE ETHER) PROCESS

BACKGROUND OF THE INVENTION

Poly(phenylene ether) is a type of plastic known for its excellent water resistance, dimensional stability, and inherent flame retardancy. Properties such as strength, stiffness, chemical resistance, and heat resistance can be tailored by blending it with various other plastics in order to meet the requirements of a wide variety of consumer products, including plumbing fixtures, electrical boxes, automotive parts, and coated wire. Poly(phenylene ether)s are also used as additives to thermoset resins, which are materials that cure to form very hard plastics. The addition of a poly(phenylene ether) can make a cured thermoset resin much less brittle.

For some uses and particularly for use in thermoset compositions, the poly(phenylene ether) can be modified by "capping" the terminal hydroxy groups with a polymerizable group such as a methacrylate ester. The capping reactions are associated with capping agents, capping byproducts, and capping catalysts that can contaminate the resulting capped poly(phenylene ether) and detract from the dielectric properties of a thermoset composition into which the capped poly(phenylene ether) is incorporated. Some methods for separating capping reaction impurities are known, but they have substantial drawbacks.

As described in U.S. Pat. No. 6,897,282 to Freshour et al., precipitating the capped poly(phenylene ether) with an antisolvent reduces the level of capping reaction impurities. However, the capped poly(phenylene ether) yields from precipitation are sometimes poor, particularly for low intrinsic viscosity capped poly(phenylene ether)s, for example capped poly(phenylene ether)s having an intrinsic viscosity of less than or equal to 0.12 deciliters per gram (dL/g) as measured in chloroform at 25° C. Furthermore, the precipitation process creates antisolvent handling and disposal problems, and also produces a capped poly(phenylene ether) with poor solid particle characteristics. The Freshour patent also discloses a method of "washing" (extracting) a capping reaction mixture with water prior to total isolation by devolatilizing extrusion. However, that method requires large volumes of the water wash relative to the volume of the poly(phenylene ether) solution, and the method was ultimately ineffective in that residual levels of impurities in the isolated capped poly(phenylene ether) were high. For example, methacrylic acid levels of 2,668 to 25,003 ppm were observed in the isolated capped poly(phenylene ether).

U.S. Pat. No. 7,589,367 to Carrillo et al. describes a liquid-liquid extraction method using an aqueous caustic soda wash to remove capping reaction impurities. However this method introduces sodium cations into the isolated capped poly(phenylene ether). This is highly undesirable in view of the use of capped poly(phenylene ether) in electrical applications. The presence of metal cations in the capped poly(phenylene ether) can adversely affect its electrical properties, rendering it unsuitable for use in these applications.

U.S. Pat. No. 4,237,265 to Eliassen et al. discloses a cocurrent or countercurrent liquid-liquid extraction in an extractor such that a continuous aqueous phase is maintained while a discrete poly(phenylene ether) solution phase is continuously contacted by the aqueous phase. The aqueous phase is a mixture of water and an alkanol having 1 to 4 carbon atoms. This process requires a relatively large volume of alkanol-water phase relative to the poly(phenylene ether) solution phase, in particular a volume ratio of alkanol-water phase to poly(phenylene ether) solution phase of 1:1 to 10:1. Thus a large amount of alkanol is used, which increases the cost of the process.

There remains a need in the art for an improved liquid-liquid extraction method for the purification of capped poly(phenylene ether). The method should be effective in removing capping agent, capping agent byproduct, and capping catalyst from poly(phenylene ether) reaction mixtures. The method should also use less solvent than the antisolvent precipitation process. In order to further minimize solvent usage, the method should use a low volume ratio of alkanol-water phase to poly(phenylene ether) solution phase. Also, the method should not introduce metal cations into the capped poly(phenylene ether).

BRIEF DESCRIPTION OF THE INVENTION

The above-described goals are achieved by a method of purifying a capped poly(phenylene ether) comprising: mixing a capped poly(phenylene ether) solution comprising a capped poly(phenylene ether), a capping agent, a capping byproduct, a capping catalyst, and a poly(phenylene ether) solvent selected from the group consisting of toluene, xylenes, mesitylene, styrene, chlorobenzene, dichlorobenzenes, chloroform, and combinations thereof, and first washing solvents comprising a C1-C4 alkanol and water to form a first liquid phase comprising the capped poly(phenylene ether) and poly(phenylene ether) solvent, and a second liquid phase comprising C1-C4 alkanol and water; and separating the first liquid phase from the second liquid phase; wherein the first liquid phase and the second liquid phase are present in a volume ratio of 1.5:1 to 10:1; wherein the first and second liquid phases combined comprise, based on 100 mole percent total of the poly(phenylene ether) solvent, C1-C4 alcohol, and water: 24 to 92 mole percent poly(phenylene ether) solvent, 1 to 56 mole percent C1-C4 alkanol, and 3 to 74 mole percent water; and wherein the first liquid phase comprises at least 95 weight percent of the capped poly(phenylene ether) in solution.

Another embodiment is a method of purifying a capped poly(phenylene ether), comprising: mixing a capped poly(phenylene ether) solution comprising a capped poly(phenylene ether), a capping agent, a capping byproduct, a capping catalyst, and toluene, and first washing solvents comprising methanol and water to form a first liquid phase comprising the capped poly(phenylene ether) and toluene, and a second liquid phase comprising methanol and water; and separating the first liquid phase from the second liquid phase; wherein the capped poly(phenylene ether) is the product of reacting a poly(phenylene ether) with the capping agent in the presence of toluene and the capping catalyst; wherein the first liquid phase and the second liquid phase are present in a volume ratio of 2:1 to 7:1; wherein the first and second liquid phases combined comprise, based on 100 mole percent total of the toluene, methanol, and water: 24 to 92 mole percent toluene, 1 to 56 mole percent methanol, and 3 to 74 mole percent water; and wherein the first liquid phase comprises at least 95 weight percent of the capped poly(phenylene ether) in solution.

Another embodiment is a method of purifying a capped poly(phenylene ether), comprising: mixing a capped poly(phenylene ether) solution comprising a capped poly(phenylene ether), (meth)acrylic anhydride, (meth)acrylic acid, 4-(N,N-dimethylamino)pyridine, and toluene, and first washing solvents comprising methanol and water to form a first liquid phase comprising the capped poly(phenylene ether) and toluene, and a second liquid phase comprising methanol and water; and separating the first liquid phase from the second liquid phase; wherein the capped poly(phenylene ether) is the product of reacting a poly(phenylene ether) with (meth)acrylic anhydride in the presence of toluene and 4-(N, N-dimethylamino)pyridine, wherein the mole ratio of (meth) acrylic anhydride to hydroxy groups on the poly(phenylene ether) is 1 to 3; wherein the poly(phenylene ether) is the product of oxidatively copolymerizing monomers comprising 2,6-xylenol and 2,2-bis(3,5-dimethyl-4-hydroxyphenyl) propane; wherein the first liquid phase and the second liquid phase are present in a volume ratio of 2:1 to 7:1; wherein the first and second liquid phases combined comprise, based on 100 mole percent total of the toluene, methanol, and water: 24 to 92 mole percent toluene, 1 to 56 mole percent methanol, and 3 to 73 mole percent water; wherein the total amount of the methanol and water in the first and second liquid phases combined is at least 25 mole percent, based on 100 mole percent total of the toluene, methanol, and water; wherein the toluene and the combination of methanol and water are present in a mole ratio of 0.75 to 3; wherein the methanol and water are present in a mole ratio of 0.5 to 3; and wherein the first liquid phase comprises at least 95 weight percent of the capped poly(phenylene ether) in solution.

BRIEF DESCRIPTION OF THE DRAWING

FIG. 1 is a phase diagram for mixtures of methanol, water, and toluene, wherein the solvent compositions of the combined first and second liquid phases combined of inventive examples are plotted.

DETAILED DESCRIPTION OF THE INVENTION

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another.

The present inventors have discovered that a high yield of capped poly(phenylene ether) having low levels of residual capping agent, capping byproduct, and capping catalyst is produced from poly(phenylene ether) capping reaction mixtures by liquid-liquid extraction with an alkanol-water wash. It is particularly surprising that poly(phenylene ether) capping reaction mixtures can be purified by this method using substantially less solvent than the antisolvent precipitation method. This reduction in antisolvent usage results in reduced raw material cost, and reduced energy cost by virtue of reduced amounts of used antisolvent to recover by distillation. The method also requires less capital equipment than the antisolvent precipitation method. To further reduce solvent usage, the method uses a reduced volume ratio of alkanol-water phase to poly(phenylene ether) solution phase. Moreover, the method does not introduce metal ions into the capped poly(phenylene ether). In another advantageous feature, the present inventors have discovered that the capped poly(phenylene ether) produced by the present method is of sufficient purity to be isolated by devolatization extrusion.

Thus, in one embodiment, a method of purifying a capped poly(phenylene ether), comprises: mixing a capped poly (phenylene ether) solution comprising a capped poly(phenylene ether), a capping agent, a capping byproduct, a capping catalyst, and a poly(phenylene ether) solvent selected from the group consisting of toluene, xylenes, mesitylene, styrene, chlorobenzene, dichlorobenzenes, chloroform, and combinations thereof, and first washing solvents comprising a C1-C4 alkanol and water to form a first liquid phase comprising the capped poly(phenylene ether) and poly(phenylene ether) solvent, and a second liquid phase comprising C1-C4 alkanol and water; and separating the first liquid phase from the second liquid phase; wherein the first liquid phase and the second liquid phase are present in a volume ratio of 1.5:1 to 10:1; wherein the first and second liquid phases combined comprise, based on 100 mole percent total of the poly(phenylene ether) solvent, C1-C4 alcohol, and water: 24 to 92 mole percent poly(phenylene ether) solvent, 1 to 56 mole percent C1-C4 alkanol, and 3 to 74 mole percent water; and wherein the first liquid phase comprises at least 95 weight percent of the capped poly(phenylene ether) in solution.

The amounts of poly(phenylene ether) solvent, C1-C4 alcohol, and water can be expressed in terms of weight percent. Thus in some embodiments, a method of purifying a capped poly(phenylene ether) comprises: mixing a poly(phenylene ether) capping reaction mixture comprising a capped poly(phenylene ether), a capping agent, a capping byproduct, a capping catalyst, and a poly(phenylene ether) solvent selected from the group consisting of toluene, xylenes, mesitylene, styrene, chlorobenzene, dichlorobenzenes, chloroform, and combinations thereof, and first washing solvents comprising a C1-C4 alkanol and water to form a first liquid phase comprising the capped poly(phenylene ether) and poly (phenylene ether) solvent, and a second liquid phase comprising C1-C4 alkanol and water; and separating the first liquid phase from the second liquid phase; wherein the first liquid phase and the second liquid phase are present in a volume ratio of about 1.5:1 to about 10:1; wherein the first and second liquid phases combined comprise, based on 100 weight percent total of the poly(phenylene ether) solvent, C1-C4 alcohol, and water, about 60 to about 98 weight percent poly (phenylene ether) solvent, about 1 to about 32 weight percent C1-C4 alkanol, and about 1 to about 36 weight percent water; and wherein the first liquid phase comprises at least 95 weight percent of the capped poly(phenylene ether) in solution.

An advantageous feature of the method is that solvent usage, per unit weight of capped poly(phenylene ether), is reduced compared to the antisolvent precipitation method. Thus in some embodiments, the poly(phenylene ether) solvent, C1-C4 alkanol, and water combined, and the capped poly(phenylene ether) are present in a weight ratio of 1:1 to 8:1, specifically 1.5:1 to 7:1, and more specifically 2:1 to 6:1.

The amounts of poly(phenylene ether) solvent, C1-C4 alkanol and water are such that the first liquid phase is in excess of the second liquid phase on a volume basis. For example, the volume ratio of the first liquid phase to the second liquid phase can be about 1.5:1 to about 10:1, specifically about 2:1 to about 8:1, more specifically about 2:1 to about 7:1, and still more specifically about 2:1 to about 6:1. In some embodiments, the poly(phenylene ether) solvent and the combination of C1-C4 alkanol and water are present in a mole ratio of 0.75 to 3.

In some embodiments, the C1-C4 alkanol and water are present in a mole ratio of 0.5 to 3.

C1-C4 alkanols and water are antisolvents for the capped poly(phenylene ether), that is the capped poly(phenylene ether) is not soluble in C1-C4 alkanols or water. Thus, when a C1-C4 alkanol and water are added to a poly(phenylene ether) capping reaction mixture comprising a capped poly (phenylene ether) and an poly(phenylene ether) solvent, the capped poly(phenylene ether) can precipitate. This is the basis of the antisolvent precipitation method for purifying poly(phenylene ether)s in which, for example, the poly(phenylene ether) is precipitated from solution in toluene by dilution with methanol. The inventors have surprisingly determined that when the first and second liquid phases combined comprise 60 to 95 weight percent poly(phenylene ether) solvent, 4 to 32 weight percent C1-C4 alkanol, and 1 to 36 weight percent water based on 100 weight percent total of the poly(phenylene ether) solvent, the C1-C4 alcohol, and the water, precipitation of the capped poly(phenylene ether) is minimized or completely avoided, and the capped poly(phenylene ether) remains in solution in the first liquid phase. Thus, in some embodiments, the first liquid phase comprises at least 95 weight percent of the capped poly(phenylene ether) in solution, specifically at least 97 weight percent, more specifically at least 99 weight percent, and still more specifically 100 weight percent of the capped poly(phenylene ether) in solution. Therefore, the method is distinguished from methods in which a capped poly(phenylene ether) dissolved in poly(phenylene ether) solvent is mixed with a C1-C4 alkanol-containing antisolvent in order to intentionally precipitate the capped poly(phenylene ether).

The method comprises mixing the poly(phenylene ether) capping reaction mixture with first washing solvents and separating the first liquid phase from the second liquid phase. In some embodiments, such as countercurrent or cocurrent extraction, the mixing and separating are done simultaneously. In some embodiments, the mixing and separating are separate steps. The separating can be done using known liquid-liquid separation methods such as gravity separation, decanting, and centrifugation. Equipment that can be used includes, for example, liquid-liquid centrifuges, decanters, countercurrent or cocurrent extraction equipment, and combinations of the foregoing equipment. When the method is conducted in batch mode, the equipment used to mix the poly(phenylene ether) capping reaction mixture with first washing solvents and to separate the first and second liquid phases can be used for subsequent washing steps as well. Alternatively, when the method is conducted in a continuous mode, different equipment is used for each washing step.

In some embodiments, separating the first and second liquid phases is by gravity. In gravity separation, the combined first and second phases are allowed to stand without agitation until two distinct layers are formed. The higher density bottom layer can be removed from the bottom of the separation vessel. Alternatively, the lower density top layer can be removed by siphoning above the first and second liquid phase interface. Gravity separation can be conducted in standard reaction vessels, and requires less energy than centrifugation. In order for gravity separation to be feasible, the first and second liquid phases should separate in a reasonable period of time. For example, the first and second liquid phases should separate in less than or equal to 2 hours, specifically less than or equal to 1 hour, more specifically less than or equal to 30 minutes, and still more specifically, less than or equal to 15 minutes. The difference in density between the first and second liquid phases at the separation temperature must be large enough in order to achieve separation times of less than or equal to 2 hours. For example, at 65° C., the difference in density between the first and second liquid phases must be 20 to 75 kilograms per cubic meter, specifically 25 to 70 kilograms per cubic meter, more specifically 30 to 65 kilograms per cubic meter, and still more specifically 35 to 60 kilograms per cubic meter.

In some embodiments, the first liquid phase comprising poly(phenylene ether) and poly(phenylene ether) solvent has a higher density than the second liquid phase comprising C1-C4 alkanol and water, so the first liquid phase is the bottom layer. In other embodiments, the second liquid phase has a higher density than the first liquid phase, so that the second liquid phase is the bottom layer. When the second liquid phase, comprising $C_1$-$C_4$ alkanol and water, has a higher density than the first liquid phase, the separation and removal of the second liquid phase from the first liquid phase can be more efficient. This is true for gravity separation as well as centrifugation.

In some embodiments, the first and second liquid phases are separated using a liquid-liquid centrifuge. Suitable liquid-liquid centrifuges are described, for example, in U.S. Pat. Nos. 2,622,797 of Hemfort, 4,614,598 of Zettier et al., and 4,755,165 of Gunnewig, and in Great Britain Patent Specification No. 884,768. Suitable liquid-liquid centrifuges are commercially available, for example from GEA-Westfalia Separator AG. Liquid-liquid centrifuges are particularly useful for continuous separation processes. Other suitable separation apparatuses include coalescers, decanters, and the like. Suitable coalescers are described, for example, in U.S. Pat. No. 6,332,987 B1 to Whitney et al., and U.S. Patent Application Publication No. US 2005/0178718 A1 of Geibel et al. Advantageously, centrifugation can be faster than gravity separation of the first and second liquid phases. The phase separation can also be cleaner with centrifugation, i.e. centrifugation affords more complete separation of the first and second liquid phases, which results in higher purity capped poly(phenylene ether). When centrifugation is employed, the force generated by centrifugation can be 1,000 to 15,000 g-forces, specifically 2,000 to 10,000 g-forces.

It is desirable to conduct the mixing and separating steps above room temperature in order to prevent the capped poly(phenylene ether) from precipitating from solution, to reduce the viscosity of the poly(phenylene ether) capping reaction mixture, and/or to facilitate separation of the first and second liquid phases. The minimum temperature is the temperature at which the viscosity of the poly(phenylene ether) capping reaction mixture is sufficiently high to permit facile mixing and separating of the first and second liquid layers. The maximum temperature is determined in part by the boiling point of the lowest boiling component of the first and second liquid phases. The lowest boiling component can be an azeotrope. It is desirable to use a temperature at or near the boiling point of the lowest boiling component so that boiling and evaporation of the lowest boiling component from the first and second liquid phases is minimized or eliminated. For example, when the poly(phenylene ether) solvent is toluene, and the C1-C4 alkanol is methanol, the lowest boiling component is methanol, which boils at 64-65° C. Thus, when the poly(phenylene ether) solvent is toluene and the C1-C4 alkanol is methanol, the mixing and the separating can be conducted at 30 to 70° C., specifically 50 to 70° C., more specifically 60 to 67° C., and still more specifically 64 to 67° C. A temperature slightly higher than the boiling point of the lowest boiling component can be acceptable when, for example, the reactor is equipped with a reflux condenser to return any evaporated solvent to the first and second liquid phases.

The first washing solvents can comprise solvents other than the C1-C4 alkanol and water. For example, it can be desirable to dilute the poly(phenylene ether) capping reaction mixture with poly(phenylene ether) solvent in order to prevent precipitation of the poly(phenylene ether) from solution, to reduce the viscosity of the poly(phenylene ether) capping reaction mixture to facilitate mixing without the application of excessive torque, and to facilitate gravity separation of the first and second liquid phases. Thus in some embodiments, the first washing solvents further comprises a poly(phenylene ether) solvent. The poly(phenylene ether) solvent added to the first washing solvents can be the same or different than the poly(phenylene ether) solvent in the poly(phenylene ether) solution. In some embodiments the poly(phenylene ether) solvent added along with the first washing solvents can be an azeotrope obtained by distillation of waste solvent streams. For example, when the poly(phenylene ether) solvent is toluene and the C1-C4 alkanol is methanol, the poly(phenylene ether) solvent can be an azeotrope comprising 72 weight percent methanol and 28 weight percent toluene. The skilled person in the art will appreciate that the more methanol added as the methanol-toluene azeotrope, the less pure methanol needs to be added to achieve a target methanol amount. Whether the first washing solvents comprise a poly(phenylene ether) solvent or not, the first and second liquid phases combined still comprise 60 to 95 weight percent poly(phenylene ether) solvent, 4 to 32 weight percent C1-C4 alkanol, and 1 to 36 weight percent water.

It is desirable that the first washing solvents combined be of sufficient volume relative to the poly(phenylene ether) capping reaction mixture, so that the second liquid phase readily separates from the first liquid phase to form a distinct layer, and so that extraction of impurities into the second liquid phase is maximized. Thus in some embodiments, the total amount of C1-C4 alkanol and water in the first and second liquid phases combined is at least 25 mole percent, based on 100 mole percent total of the poly(phenylene ether) solvent, C1-C4 alkanol, and water. The total amount of C1-C4 alkanol and water in the first and second liquid phases combined can also be at least 5 weight percent, specifically at least 8 weight percent, more specifically at least 10 weight percent, based on 100 weight percent total of the poly(phenylene ether) solvent, C1-C4 alkanol, and water.

In some embodiments, the poly(phenylene ether) solvent and the combination of C1-C4 alkanol and water are present in a mole ratio of 0.75 to 3.

In some embodiments, the poly(phenylene ether) solvent is toluene and the C1-C4 alkanol is methanol. A phase diagram depicting suitable amounts of toluene, methanol, and water for the first and second liquid phases combined is provided in FIG. 1. The lower horizontal line of the triangle is a scale of toluene content from 0 to 100 weight percent and the lower right vertex of the triangle represents 100 weight percent toluene. The right slanting line of the triangle is a scale of methanol content from 0 to 100 weight percent and the top vertex of the triangle represents 100 weight percent methanol. The left slanting line of the triangle is a scale of water content from 0 to 100 weight percent water and the lower left vertex of the triangle represents 100 weight percent water. Each point within the area of the triangle defines a specific mixture of toluene, methanol, and water based on its position relative to the three scales. When the poly(phenylene ether) solvent is toluene and the C1-C4 alkanol is methanol, the compositions of the first and second liquid phases combined of Examples 1-8 and 13-17 are represented by points 1-5 in FIG. 1.

In some embodiments, the first and second liquid phases combined comprise, based on 100 weight percent total of the poly(phenylene ether) solvent, the C1-C4 alcohol, and the water, 60 to 78 weight percent poly(phenylene ether) solvent, 4 to 32 weight percent C1-C4 alkanol, and 18 to 36 weight percent water. The amounts of poly(phenylene ether) solvent, C1-C4 alcohol, and water can also be expressed in terms of mole percent. Thus, the first and second liquid phases combined can comprise, based on 100 mole percent total of the poly(phenylene ether) solvent, the C1-C4 alcohol, and the water, 23 to 43 mole percent poly(phenylene ether) solvent, 4 to 29 mole percent C1-C4 alkanol, and 43 to 72 mole percent water.

In some embodiments, the first and second liquid phases combined comprise, based on 100 weight percent total of the poly(phenylene ether) solvent, the C1-C4 alcohol, and the water, 50 to 74 weight percent poly(phenylene ether) solvent, 25 to 32 weight percent C1-C4 alkanol, and 1 to 18 weight percent water. The amounts of poly(phenylene ether) solvent, C1-C4 alcohol, and water can also be expressed in terms of mole percent. Thus, the first and second liquid phases combined can comprise, based on 100 mole percent total of the poly(phenylene ether) solvent, the C1-C4 alcohol, and the water, 21 to 49 mole percent poly(phenylene ether) solvent, 39 to 56 mole percent C1-C4 alkanol, and 3 to 39 mole percent water.

In some embodiments, the first and second liquid phases combined comprise, based on 100 weight percent total of the poly(phenylene ether) solvent, the C1-C4 alcohol, and the water, 60 to 98 weight percent poly(phenylene ether) solvent, 1 to 25 weight percent C1-C4 alkanol, and 1 to 18 weight percent water. The amounts of poly(phenylene ether) solvent, C1-C4 alcohol, and water can also be expressed in terms of mole percent. Thus, the first and second liquid phases combined can comprise, based on 100 mole percent total of the poly(phenylene ether) solvent, the C1-C4 alcohol, and the water, 28 to 92 mole percent poly(phenylene ether) solvent, 3 to 34 mole percent C1-C4 alkanol, and 5 to 43 mole percent water.

In the present method, the first liquid phase is enriched in the poly(phenylene ether) solvent so that the first liquid phase comprises at least 95 weight percent of the poly(phenylene ether) in solution. Thus, the first liquid phase comprises, based on 100 weight percent total of the poly(phenylene ether) solvent, the C1-C4 alcohol, and the water in the first liquid phase, 90 to 99.8 weight percent poly(phenylene ether) solvent, 0.1 to 5 weight percent C1-C4 alkanol, and 0.1 to 5 weight percent water. The amounts of poly(phenylene ether) solvent, C1-C4 alcohol, and water can also be expressed in terms of mole percent. Thus, the first liquid phase can comprise, based on 100 mole percent total of the poly(phenylene ether) solvent, the C1-C4 alcohol, and the water, 69 to 99 mole percent poly(phenylene ether) solvent, 0.2 to 13 mole percent C1-C4 alkanol, and 0.5 to 21 mole percent water.

The first washing solvents comprise a C1-C4 alkanol and water. In some embodiments, the C1-C4 alkanol and water are premixed to form a washing solution, which is then mixed with the poly(phenylene ether) capping reaction mixture. In other embodiments, the C1-C4 alkanol and water are mixed sequentially or simultaneously with the poly(phenylene ether) capping reaction mixture. When the washing solvents are mixed sequentially with the poly(phenylene ether) capping reaction mixture, the washing solvents can be mixed in any order. In some embodiments, the washing solvents further comprise poly(phenylene ether) solvent in addition to the C1-C4 alkanol and water. The poly(phenylene ether) solvent can be premixed with the C1-C4 alkanol and water before adding the resulting solvent mixture to the poly(phenylene ether) solution, or it can be mixed with the poly(phenylene ether) capping reaction mixture separately, before or after mixing the C1-C4 alkanol and water with the poly(phenylene ether) capping reaction mixture. The poly(phenylene ether) solvent mixed with the washing solvents can be the same as the poly(phenylene ether) solvent in the poly(phenylene ether) capping reaction mixture, or it can be a different poly(phenylene ether) solvent.

It is desirable that the poly(phenylene ether) solvent be a good solvent for the poly(phenylene ether). In some embodiments, the poly(phenylene ether) solvent is selected from the group consisting of toluene, xylenes, mesitylene, styrene, chlorobenzene, dichlorobenzenes, chloroform, and combinations thereof. In some embodiments, the poly(phenylene ether) solvent comprises toluene.

The C1-C4 alkanol can be methanol, ethanol, n-propanol, isopropanol, n-butanol, sec-butanol, tert-butanol, ethylene glycol, propylene glycol, 1,3-propanediol, 1,4-butanediol, glycerol, or combinations thereof. In some embodiments, the C1-C4 alkanol comprises methanol, isopropanol, or a combination thereof. In some embodiments, the $C_1$-$C_4$ alkanol is methanol. The water includes tap water, deionized water, distilled water, and various other purified waters. In some embodiments, the water is deionized water. The deionized water can have a conductivity of 0.05 to 5 microsiemens per centimeter, specifically 0.05 to 4 microsiemens per centimeter, more specifically 0.05 to 1 microsiemens per centimeter, as measured according to ASTM D1193-91 at 25° C. The use of deionized water is desirable, because tap water can introduce mineral impurities into the capped poly(phenylene ether).

The capped poly(phenylene ether) has the structure $$Q(J-X)_u$$

wherein Q is the residue of a monohydric, dihydric, or polyhydric phenol, specifically the residue of a monohydric or dihydric phenol. Q has the structure

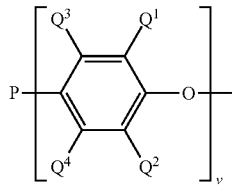

wherein $Q^1$ and $Q^2$ are independently selected from the group consisting of halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; $Q^3$ and $Q^4$ are independently selected from the group consisting of hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; u and v are 1 to 100, specifically 1, 2, or 3, and more specifically 1 or 2, provided that u equals v.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it can, optionally, contain heteroatoms over and above the carbon and hydrogen members of the substituent residue. Thus, when specifically described as substituted, the hydrocarbyl residue can also contain one or more heteroatoms such as halogens, oxygen, nitrogen, sulfur, silicon, or phosphorus. When substituted, the hydrocarbyl residue can contain the heteroatoms pendant to or within the backbone of the hydrocarbon residue. As an example, $Q^1$ can be a di-n-butylaminomethyl group formed by reaction of the methyl group of a terminal 1-hydroxy-2,6-dimethylphenylene residue with the di-n-butylamine component of an oxidative polymerization catalyst.

P is hydrogen, unsubstituted or substituted $C_1$-$C_{18}$ hydrocarbyl, or when v is 2, has the structure

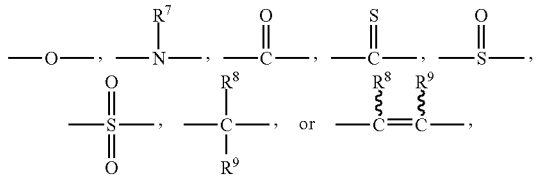

wherein $R^7$ is selected from the group consisting of hydrogen and $C_1$-$C_{12}$ hydrocarbyl, and each occurrence of $R^8$ and $R^9$ is independently selected from the group consisting of hydrogen and $C_1$-$C_{12}$ hydrocarbyl, or wherein $R^8$ and $R^9$ collectively form a $C_4$-$C_{12}$ hydrocarbylene group.

J comprises repeat units having the structure

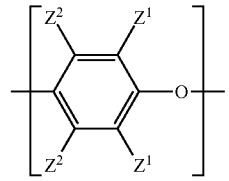

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and w is 1 to 200.

X has the structure

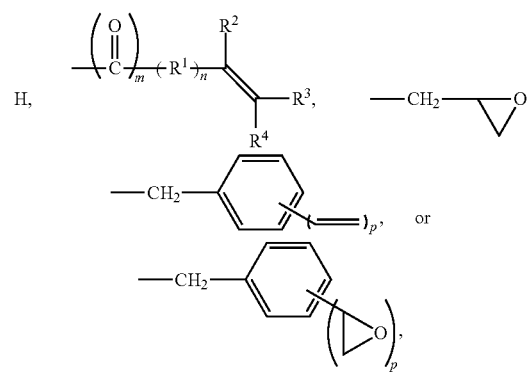

wherein $R^1$ is $C_1$-$C_{12}$ hydrocarbylene; $R^2$, $R^3$, and $R^4$ are independently hydrogen or $C_1$-$C_{18}$ hydrocarbyl; m is 0 or 1; n is 0 or 1; and each occurrence of p is independently 0, 1, 2, or 3.

In some embodiments, the capped poly(phenylene ether) comprises 2,6-dimethyl-1,4-phenylene ether units, 2,3,6-trimethyl-1,4-phenylene ether units, or a combination thereof. In some embodiments, the capped poly(phenylene ether) is a capped poly(2,6-dimethyl-1,4-phenylene ether). The capped poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The capped poly(phenylene ether) can be in the form of a homopolymer, a random copolymer, a graft copolymer, an ionomer, or a block copolymer, as well as combinations comprising at least one of the foregoing.

The capped poly(phenylene ether) can be a bifunctional capped poly(phenylene ether), comprising, on average, close to two terminal hydroxyl groups per molecule. In one embodiment, the capped poly(phenylene ether) comprises a bifunctional capped poly(phenylene ether) having the structure

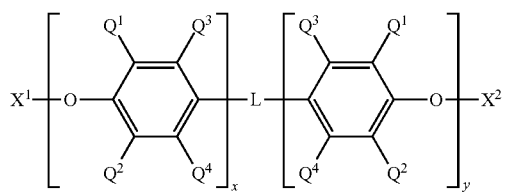

wherein each occurrence of $Q^1$ and $Q^2$ is independently selected from the group consisting of halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; and x and y are independently 0 to 100, specifically 0 to 30, more specifically 0 to 20, still more specifically 0 to 15, yet more specifically 0 to 10, even more specifically 0 to 8, provided that the sum of x and y is at least 2, specifically at least 3, more specifically at least 4. In some embodiments, the sum of x and y is 3 to 20, specifically 4 to 15.

L has the structure

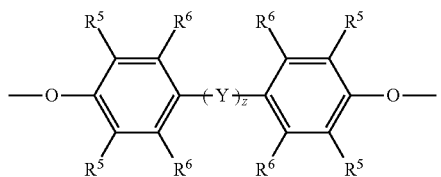

wherein each occurrence of $R^5$ and $R^6$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and Y has the structure

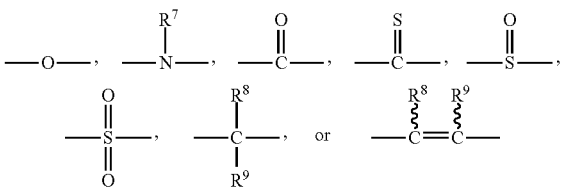

wherein $R^7$ is selected from the group consisting of hydrogen and $C_1$-$C_{12}$ hydrocarbyl, and each occurrence of $R^8$ and $R^9$ is independently selected from the group consisting of hydrogen and $C_1$-$C_{12}$ hydrocarbyl, or wherein $R^8$ and $R^9$ collectively form a $C_4$-$C_{12}$ hydrocarbylene group; and z is 0 or 1; and $X^1$ and $X^2$ are independently

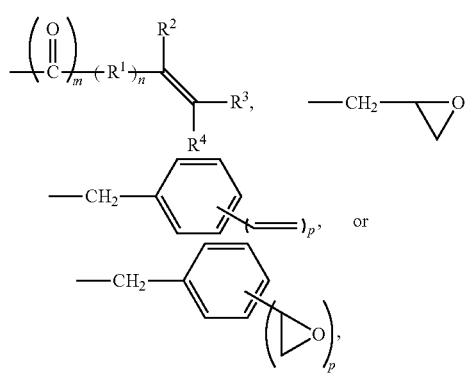

wherein $R^1$ is $C_1$-$C_{12}$ hydrocarbylene; $R^2$, $R^3$, and $R^4$ are independently hydrogen or $C_1$-$C_{18}$ hydrocarbyl; m is 0 or 1; n is 0 or 1; and each occurrence of p is independently 0, 1, 2, or 3, provided that both $X^1$ and $X^2$ are not H.

In some embodiments, each occurrence of $Q^1$ and $Q^2$ is methyl, each occurrence of $Q^3$ is hydrogen, each occurrence of $Q^4$ is hydrogen or methyl, the sum of x and y is 2 to 15, each occurrence of $R^5$ is methyl, each occurrence of $R^6$ is hydrogen, Y has the structure

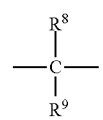

wherein $R^8$ and $R^9$ are methyl, z is 1, and $X^1$ and $X^2$ are each independently H or a methacrylate group of structure

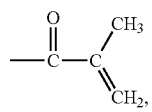

provided that at least one of $X^1$ and $X^2$ is the methacrylate group.

In some embodiments, the capped poly(phenylene ether) is a bifunctional poly(phenylene ether) having the structure

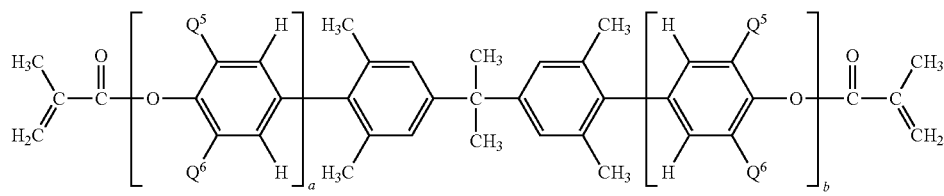

wherein each occurrence of $Q^5$ and $Q^6$ is independently methyl or di-n-butylaminomethyl; and each occurrence of a and b is independently 0 to 20, provided that the sum of a and b is at least 2, specifically at least 3, more specifically at least 4.

The method is applicable to poly(phenylene ether) capping reaction mixtures having a wide range of capped poly(phenylene ether) concentrations. Thus in some embodiments, the poly(phenylene ether) capping reaction mixture comprises 5 to 80 weight percent, specifically 7.5 to 60 weight percent, more specifically 10 to 50 weight percent, and still more specifically 15 to 40 weight percent capped poly(phenylene ether), based on the total weight of the poly(phenylene ether) capping reaction mixture.

The method is applicable to poly(phenylene ether) capping reaction mixtures having specific ranges of capping agent, capping agent byproduct, and capping catalyst. Thus in some embodiments, the poly(phenylene ether) capping reaction mixture can comprise 0.1 to 1 weight percent, specifically 0.15 to 0.75, and more specifically 0.2 to 0.6 weight percent capping agent, based on the total weight of the poly(phenylene ether) capping reaction mixture. The poly(phenylene ether) capping reaction mixture can also comprise 0.1 to 5 weight percent, specifically 0.5 to 4 weight percent, and more specifically, 1 to 3 weight percent capping agent byproduct, based on the total weight of the poly(phenylene ether) capping reaction mixture. The poly(phenylene ether) capping reaction mixture can also comprise 0.01 to 1 weight percent, specifically 0.05 to 0.75, and more specifically 0.1 to 0.5 weight percent capping catalyst, based on the total weight of the poly(phenylene ether) capping reaction mixture. In some embodiments, the poly(phenylene ether) capping reaction mixture comprises 0.1 to 1 weight percent capping agent, 0.1 to 5 weight percent capping agent byproduct, and 0.01 to 1 weight percent capping catalyst, based on the total weight of the poly(phenylene ether) capping reaction mixture.

As used herein, the term "washing step" is used to signify the combined steps of mixing a poly(phenylene ether) capping reaction mixture comprising a capped poly(phenylene ether), a capping agent, a capping byproduct, a capping catalyst, and a poly(phenylene ether) solvent with first washing solvents comprising a C1-C4 alkanol and water, and separating the first liquid phase from the second liquid phase. No limit is placed on the number of washing steps that can be used. In some embodiments, the poly(phenylene ether) capping reaction mixture can be washed multiple times, or until no further reduction in capping agent, capping agent byproduct, capping catalyst, catalyst metal ion content and/or color is obtained. The first and subsequent washing solvents can be the same or different, as long as the liquid phases formed in each washing step comprise, based on 100 weight percent total of the poly(phenylene ether) solvent, the C1-C4 alcohol, and water, 60 to 95 weight percent poly(phenylene ether) solvent, 4 to 32 weight percent C1-C4 alkanol, and 1 to 36 weight percent water; the first liquid phase and the second liquid phase are present in a volume ratio of 1.5:1 to 10:1; and the first liquid phase comprises at least 95 weight percent of the poly(phenylene ether) in solution.

In some embodiments, two washing steps are used. In particular, the separated first liquid phase from the first wash, and the second washing solvents comprising a C1-C4 alkanol and water are mixed to form a second mixture comprising a third liquid phase comprising the capped poly(phenylene ether) and poly(phenylene ether) solvent, and a fourth liquid phase comprising C1-C4 alkanol and water; and the first liquid phase is separated from the second liquid phase; wherein the separated first liquid phase and the second washing solvents are mixed in a volume ratio of 1.5:1 to 10:1; wherein the second mixture comprises, based on 100 weight percent total of the poly(phenylene ether) solvent, the C1-C4 alcohol, and the water, 60 to 95 weight percent poly(phenylene ether) solvent, 4 to 32 weight percent C1-C4 alkanol, and 1 to 36 weight percent water; and wherein the third liquid phase comprises at least 95 weight percent of the capped poly(phenylene ether) in solution.

In some embodiments, three washing steps are used. In particular, the separated third liquid phase from the second wash, and the third washing solvents comprising a C1-C4 alkanol and water are mixed to form a third mixture comprising a fifth liquid phase comprising the capped poly(phenylene ether) and poly(phenylene ether) solvent, and a sixth liquid phase comprising C1-C4 alkanol and water; and the fifth liquid phase is separated from the sixth liquid phase; wherein the separated third liquid phase and the third washing solvents are mixed in a volume ratio of 1.5:1 to 10:1; wherein the third mixture comprises, based on 100 weight percent total of the poly(phenylene ether) solvent, the C1-C4 alcohol, and the water, 60 to 95 weight percent poly(phenylene ether) solvent, 4 to 32 weight percent C1-C4 alkanol, and 1 to 36 weight percent water; and wherein the fifth liquid phase comprises at least 95 weight percent of the capped poly(phenylene ether) in solution.

The capped poly(phenylene ether) reaction mixture is formed by a method comprising reacting a poly(phenylene ether) with a capping agent in the presence of a poly(phenylene ether) solvent and a capping catalyst. The poly(phenylene ether) comprises at least one phenolic hydroxy group capable of reacting with the capping agent. The poly(phenylene ether) can have the structure $Q(J-H)_u$ wherein Q is the residue of a monohydric, dihydric, or polyhydric phenol, specifically the residue of a monohydric or dihydric phenol, wherein u is 1 to 100. Q and J are defined as above for $Q(J-X)_u$.

In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) is a poly(2,6-dimethyl-1,4-phenylene ether). As noted above, the poly (phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a random copolymer, a graft copolymer, an ionomer, or a block copolymer, as well as combinations comprising at least one of the foregoing.

The poly(phenylene ether) can comprise one or more than one phenolic hydroxy group. When the poly(phenylene ether) comprises one phenolic hydroxy group, it is referred as a monofunctional poly(phenylene ether). When the poly(phenylene ether) comprises more than one phenolic hydroxy group, it is referred to as a polyfunctional poly(phenylene ether). In some embodiments, the polyfunctional poly(phenylene ether) is a bifunctional poly(phenylene ether) (that is, a poly(phenylene ether) having two phenolic hydroxy groups), and having the structure

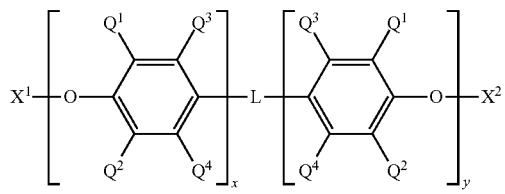

wherein $Q^1$, $Q^2$, $Q^3$, $Q^4$, L, x and y are defined as above.

In some embodiments, each occurrence of $Q^1$ and $Q^2$ is methyl, each occurrence of $Q^3$ is hydrogen, each occurrence of $Q^4$ is hydrogen or methyl, the sum of x and y is 2 to 15, each occurrence of $R^5$ is methyl, each occurrence of $R^6$ is hydrogen, and Y has the structure

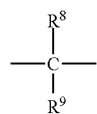

wherein $R^8$ and $R^9$ are methyl, and z is 1.

In the bifunctional poly(phenylene ether) structure above, there are limitations on the variables x and y, which correspond to the number of phenylene ether repeating units at two different places in the bifunctional poly(phenylene ether) molecule. In the structure, x and y are independently 0 to 100, specifically 0 to 30, more specifically 0 to 20, still more specifically 0 to 15, even more specifically 0 to 10, and yet more specifically 0 to 8. The sum of x and y is at least 2, specifically at least 3, more specifically at least 4. A particular polyfunctional poly(phenylene ether) can be analyzed by proton nuclear magnetic resonance spectroscopy ('H NMR) to determine whether these limitations are met for the entire resin, on average. Specifically, $^1$H NMR can distinguish between resonances for protons associated with internal and terminal phenylene ether groups, and internal and terminal residues of a polyhydric phenol, as well as other terminal residues. It is therefore possible to determine the average number of phenylene ether repeat units per molecule, and the relative abundance of internal and terminal residues derived from dihydric phenol.

In some embodiments, the polyfunctional poly(phenylene ether) is a bifunctional poly(phenylene ether) having the structure

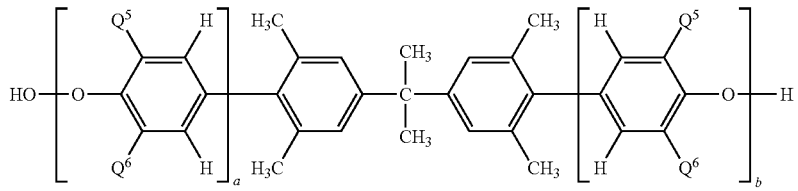

wherein each occurrence of $Q^5$ and $Q^6$ is independently methyl or di-n-butylaminomethyl; and each occurrence of a and b is independently 0 to 20, provided that the sum of a and b is at least 2, specifically at least 3, more specifically at least 4. Bifunctional poly(phenylene ether)s having this structure can be synthesized by oxidative copolymerization of 2,6-xylenol and 2,2-bis(3,5-dimethyl-4-hydroxyphenyl)propane in the presence of a catalyst comprising di-n-butylamine.

Poly(phenylene ether)s can be prepared by oxidative polymerization of monomers comprising a monohydric phenol, such as 2,6-dimethylphenol, 2,3,6-trimethylphenol, or a mixture thereof. Many other suitable monohydric phenols are known in the art. Polyfunctional poly(phenylene ether)s (that is, poly(phenylene ether)s having two or more phenolic hydroxy groups) can be prepared by oxidative copolymerization of a monohydric phenol and a polyhydric phenol. Suitable polyhydric phenols include, for example, 3,3',5,5'-tetramethyl-4,4'-biphenol, 2,2-bis(3-methyl-4-hydroxyphenyl)propane, 2,2-bis(3,5-dimethyl-4-hydroxyphenyl)propane, 1,1-bis(4-hydroxyphenyl)methane, 1,1-bis(4-hydroxyphenyl)ethane, 2,2-bis(4-hydroxyphenyl)propane 2,2-bis(4-hydroxyphenyl)butane, 2,2-bis(4-hydroxyphenyl)octane, 1,1-bis(4-hydroxyphenyl)propane, 1,1-bis(4-hydroxyphenyl)-n-butane, bis(4-hydroxyphenyl)phenylmethane, 1,1-bis(4-hydroxy-3-methylphenyl)cyclohexane, 1,1-bis(4-hydroxy-3,5-dimethylphenyl)cyclopentane, 1,1-bis(4-hydroxy-3,5-dimethylphenyl)cyclohexane, 1,1-bis(4-hydroxy-3-methylphenyl)cycloheptane, 1,1-bis(4-hydroxy-3,5-dimethylphenyl)cycloheptane, 1,1-bis(4-hydroxy-3-methylphenyl)cyclooctane, 1,1-bis(4-hydroxy-3,5-dimethylphenyl)cyclooctane, 1,1-bis(4-hydroxy-3-methylphenyl)cyclononane, 11,1-bis(4-hydroxy-3,5-dimethylphenyl)cyclononane, 1,1-bis(4-hydroxy-3-methylphenyl)cyclodecane, 1,1-bis(4-hydroxy-3,5-dimethylphenyl)cyclodecane, 1,1-bis(4-hydroxy-3-methylphenyl)cycloundecane, 1,1-bis(4-hydroxy-3,5-dimethylphenyl)cycloundecane, 1,1-bis(4-hydroxy-3-methylphenyl)cyclododecane, 1,1-bis(4-hydroxy-3,5-dimethylphenyl)cyclododecane, 1,1-bis(4-hydroxy-3-t-butylphenyl)propane, 2,2-bis(4-hydroxy-2,6-dimethylphenyl)propane 2,2-bis(4-hydroxy-3-bromophenyl)propane, 1,1-bis(4-hydroxyphenyl) cyclopentane, 1,1-bis(4-hydroxyphenyl)cyclohexane, 1,1,1-tris(3,5-dimethyl-4-hydrxyphenyl)ethane 1,1,1-tris(3-methyl-4-hydroxyphenyl)ethane, 1,3,5-tris(3,5-dimethyl-4- hydroxyphenyl-1-keto)benzene, 1,3,5-tris(3,5-dimethyl-4-hydroxyphenyl-1-isopropylidene)benzene, 2,2,4,4-tetrakis(3-methyl-4-hydroxyphenyl)pentane, 2,2,4,4-tetrakis(3,5-dimethyl-4-hydroxyphenyl)pentane, 1,1,4,4-tetrakis(3-methyl-4-hydroxyphenyl)cyclohexane, 1,1,4,4-tetrakis(3,5-dimethyl-4-hydroxyphenyl)cyclohexane, 1,3,5-tris(3,5-dimethyl-4-hydroxyphenyl)benzene, 1,3,5-tris(3-methyl-4-hydroxyphenyl)benzene, 2,6-bis(2-hydroxy-5-methylbenzyl)-4-methylphenol, 4,6-dimethyl-2,4,6-tris(4-hydroxy-3-methylphenyl)-2-heptene, 4,6-dimethyl-2,4,6-tris(4-hydroxy-3,5-dimethylphenyl)-2-heptene, 4,6-dimethyl-2,4,6-tris(4-hydroxy-3-methylphenyl)heptane, 4,6-dimethyl-2,4,6-tris(4-hydroxy-3-methylphenyl)heptane, 2,4-bis(4-hydroxy-3-methylphenylisopropyl)phenol, 2,4-bis(4-hydroxy-3,5-dimethylphenylisopropyl)phenol, tetrakis(4-hydroxy-3-methylphenyl)methane, tetrakis(4-hydroxy-3,5-dimethylphenyl)methane, tetrakis(4-[4-hydroxy-3-methylphenylisopropyl]phenoxy)methane, tetrakis(4-[4-hydroxy-3,5-dimethylphenylisopropyl]-phenoxy)methane, and mixtures thereof. In some embodiments, the polyhydric phenol comprises 3 to 8 phenolic hydroxy groups per molecule. In some embodiments, the polyfunctional poly(phenylene ether) is a bifunctional poly(phenylene ether) prepared by oxidative copolymerization of 2,6-dimethylphenol and 2,2-bis(3,5-dimethyl-4-hydroxyphenyl)propane.

The poly(phenylene ether) can be prepared by oxidative polymerization of at least one monohydric phenol, optionally in combination with at least one dihydric or polyhydric phenol, in the presence of a polymerization catalyst comprising a catalyst metal ion and a catalyst amine ligand, oxygen, and poly(phenylene ether) solvent. The polymerization catalyst can be prepared in situ by mixing the catalyst metal ion and the catalyst amine ligand. The poly(phenylene ether) solvent can be benzene, toluene, xylenes, mesitylene, chlorobenzene, dichlorobenzenes, chloroform, or combinations thereof. In some embodiments, the poly(phenylene ether) solvent comprises toluene. The molecular oxygen can be provided, for example, in a purified form or as air.

Catalyst metal ions for the preparation of the poly(phenylene ether) can comprise at least one heavy metal ion such as a copper, manganese or cobalt. Metal salts which can serve as sources of catalyst metal ions include cuprous chloride, cupric chloride, cuprous bromide, cupric bromide, cuprous iodide, cupric iodide, cuprous sulfate, cupric sulfate, cuprous tetraamine sulfate, cupric tetraamine sulfate, cuprous acetate, cupric acetate, cuprous propionate, cupric butyrate, cupric laurate, cuprous palmitate and cuprous benzoate; and similar manganese salts and cobalt salts. Suitable catalyst amine ligands include dialkylamines (such as di-n-butylamine, or DBA), trialkylamines (such as N,N-dimethylbutylamine, or DMBA), and alkylenediamines (such as N,N'-di-tert-butyl-ethylenediamine, or DBEDA). Instead of direct addition of any of the above-exemplified metal salts, it is also possible to add a metal or a metal oxide and an inorganic acid, organic acid or an aqueous solution of such an acid to form the corresponding metal salt or hydrate in situ.

The poly(phenylene ether) can also be prepared by a process comprising oxidatively polymerizing a monohydric phenol in the presence of a catalyst under conditions suitable to form a corresponding poly(phenylene ether) and a corresponding diphenoquinone; separating the poly(phenylene ether) and the diphenoquinone from the catalyst; and equilibrating the poly(phenylene ether) and the diphenoquinone to form a poly(phenylene ether) having two terminal hydroxy groups. An illustrative example of a corresponding poly(phenylene ether) is poly(2,6-dimethyl-1,4-phenylene ether) prepared from oxidative polymerization of 2,6-dimethylphenol. An illustrative example of a corresponding diphenoquinone is 3,3',5,5'-tetramethyl-4,4'-diphenoquinone formed by oxidation of 2,6-dimethylphenol. When this preparation method is used, it may be necessary to purify the bifunctional poly(phenylene ether) to achieve a polydispersity index less than 2.2.

The poly(phenylene ether) can also be prepared by a so-called redistribution reaction in which a monofunctional poly(phenylene ether) is equilibrated with a polyhydric phenol, optionally in the presence of an oxidizing agent. Redistribution reactions are known in the art and described, for example, in U.S. Pat. Nos. 3,496,236 to Cooper et al. and 5,880,221 to Liska et al. When this preparation method is used, it may be necessary to purify the polyfunctional poly(phenylene ether) to achieve a polydispersity index less than 2.2.

The method of preparing a capped poly(phenylene ether) is applicable to poly(phenylene ether)s having a broad range of intrinsic viscosities. For example, the poly(phenylene ether) can have an intrinsic viscosity of 0.04 to 1 deciliters per gram (dL/g), specifically 0.06 to 0.6 dL/g, more specifically 0.09 to 0.4 dL/g, still more specifically 0.09 to 0.3 dL/g, even more specifically 0.09 to 0.2 dL/g, yet more specifically 0.09 to 0.15 dL/g, and even more specifically 0.09 to 0.12 dL/g, all measured in chloroform at 25° C. These intrinsic viscosity limitations apply to the capped poly(phenylene ether) as well.

The capped poly(phenylene ether) reaction mixture is formed by a method comprising reacting the poly(phenylene ether) with a capping agent in the presence of a poly(phenylene ether) solvent and a capping catalyst. Capping agents capable of reaction with poly(phenylene ether)s to form capped poly(phenylene ether)s are known in the art. See, for example, U.S. Pat. Nos. 4,562,243 and 4,634,742 and 4,665,137 to Percec, 4,663,402 to Percec et al., 6,306,978 B1 and 6,384,176 to Braat et al., 6,627,704 B2 to Yeager et al., and 6,962,965 to Yeager; and U.S. Statutory Invention Registration H521 to Fan. Among the types of capping agents that can be used are, for example, halohydrocarbons (such as chloromethylstyrene and allyl chloride), carboxylic acid halides (such as acetyl chloride, acryloyl chloride, and methacryloyl chloride), carboxylic acid esters (such as phenyl salicylate), carboxylic acid anhydrides (such as acetic anhydride, acrylic anhydride, and methacrylic anhydride), carbonate esters (such as diphenyl carbonate and bis(4-vinylphenyl) carbonate), isocyanates (including diisocyanates), and epichlorohydrin.

The molar ratio of the capping agent to phenolic hydroxy groups on the poly(phenylene ether) is chosen to balance the need for rapid and complete capping (which favors high ratios) with the need to avoid introducing excess reagents that increase the amount of impurities present in the poly(phenylene ether) capping reaction mixture (which favors low ratios). It has been observed that choosing a molar ratio of capping agent to hydroxy groups on the poly(phenylene ether) of 1 to 3, specifically 1.05 to 2, more specifically 1.1 to 1.5, strikes a good balance between these competing demands.

The poly(phenylene ether) is reacted with the capping agent in the presence of a poly(phenylene ether) solvent. Suitable poly(phenylene ether) solvents include toluene, xylenes, mesitylene, styrene, chlorobenzene, dichlorobenzenes, chloroform, and combinations thereof. In some embodiments, the solvent is toluene.

The reaction of the poly(phenylene ether) with the capping agent is also conducted in the presence of a capping catalyst. The type of capping catalyst used will depend on the type of capping agent used. For example, when the capping agent is a halohydrocarbon, a carboxylic acid halide, a carboxylic acid ester, or a carboxylic acid anhydride, the capping catalyst is typically a Bronsted-Lowry base (that is, a base capable of accepting a proton from a terminal hydroxyl group of the poly(phenylene ether)). Bronsted-Lowry bases include, for example, alkali metal hydroxides (such as lithium hydroxide, sodium hydroxide, and potassium hydroxide), unsubstituted and substituted ammonium hydroxides (such as ammonium hydroxide and tetramethylammonium hydroxide), and amines (including primary, secondary, and specifically tertiary amines such as 4-(N,N-dimethylamino)pyridine).

The type of capping byproduct formed will also depend on the type of capping agent used. When the capping agent is a halohydrocarbon or a carboxylic acid halide, the capping byproduct will typically be a halide ion (such as chloride ion). When the capping agent is a carboxylic acid ester or a carbonate ester, the capping byproduct will be an alcohol (such as methanol, or phenol). When the capping agent is a carboxylic acid anhydride, the capping byproduct will be a carboxylic acid (such as acetic acid from acetic acid anhydride, acrylic acid from acrylic acid anhydride, or methacrylic acid, form methacrylic anhydride).

In some embodiments, the capping agent is (meth)acrylic anhydride, the capping byproduct is (meth)acrylic acid, the capping catalyst is 4-(N,N-dimethylamino)pyridine, and the poly(phenylene ether) solvent is toluene. The poly(phenylene ether) can be the product of oxidatively copolymerizing monomers comprising 2,6-xylenol and 2,2-bis(3,5-dimethyl-4-hydroxyphenyl)propane, and the molar ratio of (meth) acrylic anhydride to hydroxy groups on the poly(phenylene ether) can be 1 to 3. Thus, in some embodiments, the capped poly(phenylene ether) is the product of reacting a poly(phenylene ether) with a capping agent in the presence of poly (phenylene ether) solvent and a capping catalyst; wherein the poly(phenylene ether) is the product of oxidatively copolymerizing monomers comprising 2,6-xylenol and 2,2-bis(3,5-dimethyl-4-hydroxyphenyl)propane; wherein the capping agent is (meth)acrylic anhydride; wherein the molar ratio of (meth)acrylic anhydride to hydroxy groups on the poly(phenylene ether) is 1 to 3; wherein the poly(phenylene ether) solvent is toluene; wherein the capping catalyst is 4-(N,N-dimethylamino)pyridine; and wherein the capping byproduct is (meth)acrylic acid. As used herein, the term (meth)acrylic anhydride denotes acrylic anhydride or methacrylic anhydride, and the term "(meth)acrylic acid" denotes acrylic acid or methacrylic acid.

In some embodiments, the capping step is carried on a polymerization reaction mixture that comprises an oxidative polymerization catalyst metal ion, such as copper or manganese. Thus, the method can comprise oxidatively polymerizing a monohydric phenol in the presence of a poly(phenylene ether) solvent and a catalyst metal ion to form a polymerization reaction mixture comprising the poly(phenylene ether), poly(phenylene ether) solvent, and catalyst metal ion. In some embodiments, the poly(phenylene ether) solvent is removed from the polymerization reaction mixture prior to the capping step. The amount of catalyst metal ion, for example copper ion, in a poly(phenylene ether) can be reduced by extracting a solution of the poly(phenylene ether) in poly(phenylene ether) solvent with an aqueous chelating agent. See, for example, U.S. Pat. No. 3,838,102 to Bennett. Suitable chelating agents include, for example, polyalkylenepolyamine polycarboxylic acids, aminopolycarboxylic acids, aminocarboxylic acids, polycarboxylic acids, alkali metal salts of the foregoing acids, alkaline earth metal salts of the foregoing acids, mixed alkali metal-alkaline earth metal salts of the foregoing acids, and combinations thereof. Examples of specific chelating agents are alkali metal salts of nitrilotriacetic acid, alkali metal salts of ethylenediaminetetraacetic acid, and combinations thereof. A specific example of a chelating agent is trisodium nitrilotriacetate. The chelating agent can be used in an amount of 1 to 15 moles per mole of catalyst metal ion.

The amount of catalyst metal ion in the polymerization reaction mixture can be reduced by chelation prior to the capping reaction. Alternatively, the amount of catalyst metal ion can be reduced by chelation after the capping reaction and before alkanol-water washing. Thus, in some embodiments, prior to mixing with the first washing solvents, the poly(phenylene ether) capping reaction mixture comprises less than or equal to 900 parts per million by weight, specifically less than or equal to 700 parts per million by weight, more specifically less than or equal to 500 parts per million by weight, and still more specifically less than or equal to 300 parts per million by weight, of catalyst metal ion, based on the weight of poly (phenylene ether).

The method is effective in reducing the amount of catalyst metal ion to levels comparable to those obtained by the antisolvent-precipitation method. However further reductions in catalyst metal ion amounts can be achieved by addition of a chelating agent to any one or combination of first and subsequent washing solvents. The chelating agent can be dissolved in the first washing solvents in a ratio of moles of chelating agent to moles of catalyst metal ion of 1:1 to 10:1, specifically 1:1 to 7:1, and more specifically 1:1 to 4:1. Thus, in some embodiments, the poly(phenylene ether) capping reaction mixture comprises a catalyst metal ion, and a chelating agent is dissolved in the first washing solvents, wherein the first and second liquid phases combined comprise a ratio of moles of chelating agent to moles of catalyst metal ion of 1:1 to 10:1.

The method is applicable to poly(phenylene ether) capping reaction mixtures that have been washed with aqueous chelating agent to remove catalyst metal ions, and to other capped poly(phenylene ether) solutions comprising relatively low concentrations of catalyst metal ion. For example, the method is applicable to capped poly(phenylene ether) solutions prepared from solid capped poly(phenylene ether) that has already been isolated from poly(phenylene ether) capping reaction mixtures. This can be desirable, for example, when further reduction in the levels of capping agent, capping agent byproduct, capping catalyst, and/or catalyst metal ion in the solid capped poly(phenylene ether) is desired, or when the color of the solid capped poly(phenylene ether) is unacceptable. In some embodiments, prior to mixing with the first washing solvents, the concentration of catalyst metal ion in the capped poly(phenylene ether) solution can be less than or equal to 100 parts per million by weight, specifically less than or equal to 50 parts per million by weight, more specifically less than or equal to 30 parts per million by weight, and still more specifically less than or equal to 10 parts per million by weight, based on the weight of the capped poly(phenylene ether).

In some embodiments, a chelating agent is not added to the washing solvents. In some embodiments, less than 10 parts per million by weight, specifically less than 5 parts per million by weight, and more specifically less than 1 part per million by weight, of a chelating agent, based on the total weight of the first washing solvents, is dissolved in the first washing solvents. In some embodiments, chelating agent is excluded from the first washing solvents.

In some embodiments, for example where the intended use of the capped poly(phenylene ether) is as an additive for a thermoset resin, it can be desirable to isolate the capped poly(phenylene ether) in solid form from the first or subsequent liquid phases comprising the capped poly(phenylene ether) and poly(phenylene ether) solvent. Thus in some embodiments, the method further comprises isolating the capped poly(phenylene ether) from the separated first liquid phase. There are several methods for isolating solid capped poly(phenylene ether) from poly(phenylene ether) capping reaction mixtures. One method comprises precipitation with an antisolvent. However this method suffers from the high capital costs of solids handling equipment, the relatively high cost for the processing of solid capped poly(phenylene ether) in terms of energy and cycle time, the large volumes of antisolvent that are required, and the energy required for recovery of the antisolvent by distillation.

The capped poly(phenylene ether) can also be isolated by a total isolation method. The term "total isolation method" refers to an isolation method that removes volatile components. Suitable total isolation methods include devolatilizing extrusion, spray drying, wiped film evaporation, flake evaporation, flash devolatilization (for example, using a flash vessel with a melt pump), and combinations of the foregoing methods. Other isolation methods include steam precipitation and crumb formation with hot water. In some embodiments, the total isolation method comprises devolatilizing extrusion.

In some embodiments, a method of purifying a capped poly(phenylene ether), comprises: mixing a capped poly (phenylene ether) solution comprising a capped poly(phenylene ether), a capping agent, a capping byproduct, a capping catalyst, and toluene, and first washing solvents comprising methanol and water to form a first liquid phase comprising the capped poly(phenylene ether) and toluene, and a second liquid phase comprising methanol and water; and separating the first liquid phase from the second liquid phase; wherein the capped poly(phenylene ether) is the product of reacting a poly(phenylene ether) with the capping agent in the presence of toluene and the capping catalyst; wherein the first liquid phase and the second liquid phase are present in a volume ratio of 2:1 to 7:1; wherein the first and second liquid phases combined comprise, based on 100 mole percent total of the toluene, methanol, and water: 24 to 92 mole percent toluene, 1 to 56 mole percent methanol, and 3 to 74 mole percent water; and wherein the first liquid phase comprises at least 95 weight percent of the capped poly(phenylene ether) in solution. The volume ratio of the first liquid phase to the second liquid phase can be about 1.5:1 to about 10:1, specifically about 2:1 to about 8:1, more specifically about 2:1 to about 7:1, and still more specifically about 2:1 to about 6:1. The total amount of methanol and water in the first and second liquid phases combined can be at least 25 mole percent, based on 100 mole percent total of the toluene, methanol, and water. The methanol and water can be present in a mole ratio of 0.75 to 3. The toluene and the combination of methanol and water can be present in a mole ratio of 0.5 to 3.

In a specific embodiment, a method of purifying a capped poly(phenylene ether), comprises: mixing a capped poly (phenylene ether) solution comprising a capped poly(phenylene ether), (meth)acrylic anhydride, (meth)acrylic acid, 4-(N,N-dimethylamino)pyridine, and toluene, and first washing solvents comprising methanol and water to form a first liquid phase comprising the capped poly(phenylene ether) and toluene, and a second liquid phase comprising methanol and water; and separating the first liquid phase from the second liquid phase; wherein the capped poly(phenylene ether) is the product of reacting a poly(phenylene ether) with (meth)acrylic anhydride in the presence of toluene and 4-(N,N-dimethylamino)pyridine, wherein the mole ratio of (meth)acrylic anhydride to hydroxy groups on the poly(phenylene ether) is 1 to 3; wherein the poly(phenylene ether) is the product of oxidatively copolymerizing monomers comprising 2,6-xylenol and 2,2-bis(3,5-dimethyl-4-hydroxyphenyl)propane; wherein the first liquid phase and the second liquid phase are present in a volume ratio of 2:1 to 7:1; wherein the first and second liquid phases combined comprise, based on 100 mole percent total of the toluene, methanol, and water: 24 to 92 mole percent toluene, 1 to 56 mole percent methanol, and 3 to 73 mole percent water; wherein the total amount of the methanol and water in the first and second liquid phases combined is at least 25 mole percent, based on 100 mole percent total of the toluene, methanol, and water; wherein the toluene and the combination of methanol and water are present in a mole ratio of 0.75 to 3; wherein the methanol and water are present in a mole ratio of 0.5 to 3; and wherein the first liquid phase comprises at least 95 weight percent of the capped poly(phenylene ether) in solution.

The amounts of toluene, methanol, and water can be expressed in terms of weight percent. Thus, a method of purifying a capped poly(phenylene ether), comprises: mixing a capped poly(phenylene ether) solution comprising a capped poly(phenylene ether), (meth)acrylic anhydride, (meth)acrylic acid, 4-(N,N-dimethylamino)pyridine, and toluene, and first washing solvents comprising methanol and water to form a first liquid phase comprising the capped poly(phenylene ether) and toluene, and a second liquid phase comprising methanol and water; and separating the first liquid phase from the second liquid phase; wherein the capped poly(phenylene ether) is the product of reacting a poly(phenylene ether) with (meth)acrylic anhydride in the presence of toluene and 4-(N,N-dimethylamino)pyridine; wherein the poly(phenylene ether) is the product of oxidatively copolymerizing monomers comprising 2,6-xylenol and 2,2-bis(3,5-dimethyl-4-hydroxyphenyl)propane; wherein the mole ratio of (meth)acrylic anhydride to hydroxy groups on the poly(phenylene ether) is 1 to 3; wherein the first liquid phase and the second liquid phase are present in a volume ratio of 2:1 to 7:1; wherein the first and second liquid phases combined comprise, based on 100 weight percent total of the toluene, methanol, and water, 60 to 98 weight percent toluene, 1 to 25 weight percent methanol, and 1 to 18 weight percent water; and wherein the first liquid phase comprises at least 95 weight percent of the capped poly(phenylene ether) in solution.

The method provides capped poly(phenylene ether) of high purity. For example, the method can provide (meth)acrylate-capped poly(phenylene ether) comprising less than or equal to 4,000 parts per million by weight, specifically less than or equal to 3,000 parts per million by weight, more specifically less than or equal to 2,500 parts per million by weight, and still more specifically less than or equal to 2,000 parts per million by weight of (meth)acrylic acid. The method can also provide (meth)acrylate-capped poly(phenylene ether) having less than or equal to 1,000 parts per million by weight, specifically less than or equal to 800 parts per million by weight, and more specifically less than or equal to 500 parts per million by weight of (meth)acrylic anhydride. The method can also provide (meth)acrylate-capped poly(phenylene ether) having less than or equal to 1,500 parts per million by weight, specifically less than or equal to 1,200 parts per million by weight, more specifically less than or equal to 1,000 parts per million by weight, and still more specifically less than or equal to 800 parts per million by weight of 4-(N,N-dimethylamino)pyridine.

The method is also effective in reducing catalyst metal ion and colored impurity content. In some embodiments, the method provides capped poly(phenylene ether) having less than or equal to 100 parts per million by weight, specifically less than or equal to 50 parts per million by weight, more specifically, less than or equal to 10 parts per million by weight, and still more specifically, less than or equal to 2 parts per million by weight, based on the weight of the capped poly(phenylene ether), of catalyst metal ion. In some embodiments, the method provides capped poly(phenylene ether) having a yellowness index of less than or equal to 30, specifically less than or equal to 26, more specifically less than or equal to 24, and still more specifically, less than or equal to 22, as measured in accordance with ASTM E 313-00 and D 1925-70.

The invention includes at least the following embodiments.

Embodiment 1

A method of purifying a capped poly(phenylene ether), comprising: mixing a capped poly(phenylene ether) solution comprising a capped poly(phenylene ether), a capping agent, a capping byproduct, a capping catalyst, and a poly(phenylene ether) solvent selected from the group consisting of toluene, xylenes, mesitylene, styrene, chlorobenzene, dichlorobenzenes, chloroform, and combinations thereof, and first washing solvents comprising a C1-C4 alkanol and water to form a first liquid phase comprising the capped poly(phenylene ether) and poly(phenylene ether) solvent, and a second liquid phase comprising C1-C4 alkanol and water; and separating the first liquid phase from the second liquid phase; wherein the first liquid phase and the second liquid phase are present in a volume ratio of 1.5:1 to 10:1; wherein the first and second liquid phases combined comprise, based on 100 mole percent total of the poly(phenylene ether) solvent, C1-C4 alcohol, and water: 24 to 92 mole percent poly(phenylene ether) solvent, 1 to 56 mole percent C1-C4 alkanol, and 3 to 74 mole percent water; and wherein the first liquid phase comprises at least 95 weight percent of the capped poly(phenylene ether) in solution.

Embodiment 2

The method of embodiment 1, wherein the total amount of C1-C4 alkanol and water in the first and second liquid phases combined is at least 25 mole percent, based on 100 mole percent total of the poly(phenylene ether) solvent, C1-C4 alkanol, and water.

Embodiment 3

The method of any of the foregoing embodiments, wherein the poly(phenylene ether) solvent and the combination of C1-C4 alkanol and water are present in a mole ratio of 0.75 to 3.

Embodiment 4

The method of any of the foregoing embodiments, wherein the C1-C4 alkanol and water are present in a mole ratio of 0.5 to 3.

Embodiment 5

The method of any of the foregoing embodiments, wherein the first washing solvents further comprise poly(phenylene ether) solvent.

Embodiment 6

The method of any of the foregoing embodiments, wherein less than 10 parts per million by weight of a chelating agent, based on the total weight of the first washing solvents, is dissolved in the first washing solvents.

Embodiment 7

The method of any of the foregoing embodiments, wherein the capped poly(phenylene ether) has the structure $$Q(J-X)_u$$

wherein Q has the structure

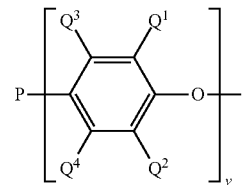

wherein $Q^1$ and $Q^2$ are independently selected from the group consisting of halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; $Q^3$ and $Q^4$ are independently selected from the group consisting of hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; u and v are 1 to 100, provided that u equals v; P is hydrogen, unsubstituted or substituted $C_1$-$C_{18}$ hydrocarbyl, or when v is 2, has the structure

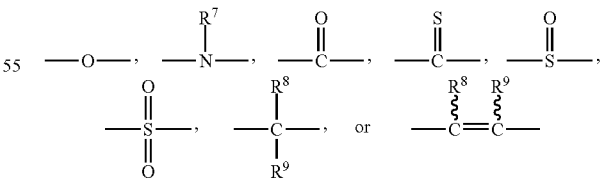

wherein $R^7$ is selected from the group consisting of hydrogen and $C_1$-$C_{12}$ hydrocarbyl, and each occurrence of $R^8$ and $R^9$ is independently selected from the group consisting of hydrogen and $C_1$-$C_{12}$ hydrocarbyl, or wherein $R^8$ and $R^9$ collectively form a $C_4$-$C_{12}$ hydrocarbylene group; J comprises repeat units having the structure

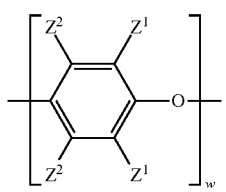

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and w is 1 to 200; and X has the structure

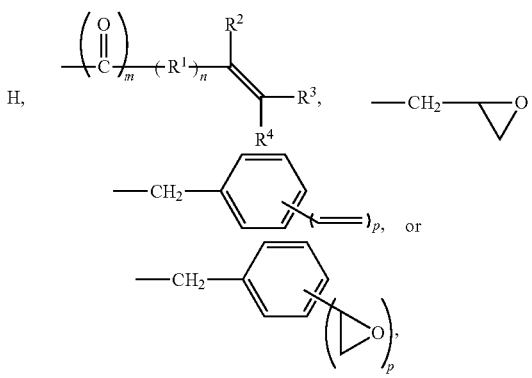

wherein $R^1$ is $C_1$-$C_{12}$ hydrocarbylene; $R^2$, $R^3$, and $R^4$ are independently hydrogen or $C_1$-$C_{18}$ hydrocarbyl; m is 0 or 1; n is 0 or 1; and each occurrence of p is independently 0, 1, 2, or 3.

Embodiment 8

The method of any of the foregoing embodiments, wherein the capped poly(phenylene ether) comprises a bifunctional poly(phenylene ether) having the structure

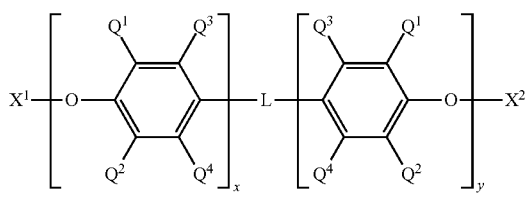

wherein each occurrence of $Q^1$ and $Q^2$ is independently selected from the group consisting of halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; and x and y are independently 0 to 100, provided that the sum of x and y is at least 2; L has the structure

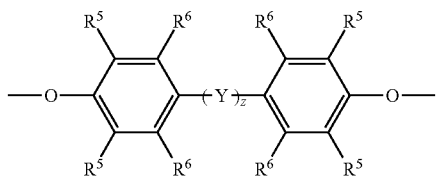

wherein each occurrence of $R^5$ and $R^6$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; Y has the structure

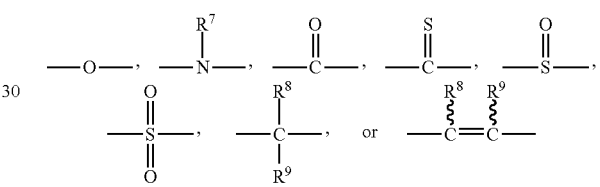

wherein $R^7$ is selected from the group consisting of hydrogen and $C_1$-$C_{12}$ hydrocarbyl, and each occurrence of $R^8$ and $R^9$ is independently selected from the group consisting of hydrogen and $C_1$-$C_{12}$ hydrocarbyl, or wherein $R^8$ and $R^9$ collectively form a $C_4$-$C_{12}$ hydrocarbylene group; and z is 0 or 1; and $X^1$ and $X^2$ are independently

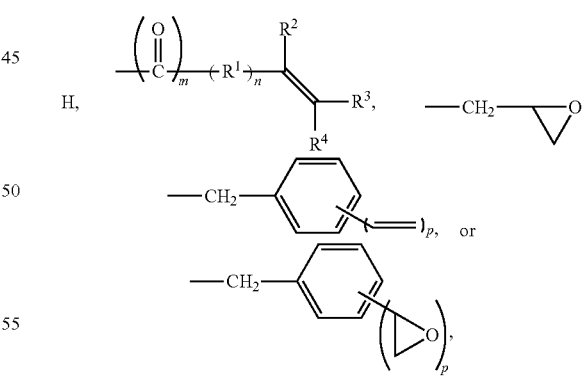

wherein $R^1$ is $C_1$-$C_{12}$ hydrocarbylene; $R^2$, $R^3$, and $R^4$ are independently hydrogen or $C_1$-$C_{18}$ hydrocarbyl; m is 0 or 1; n is 0 or 1; and each occurrence of p is independently 0, 1, 2, or 3, provided that both $X^1$ and $X^2$ are not H.

Embodiment 9

The method of any of the foregoing embodiments, wherein the capped poly(phenylene ether) has the structure

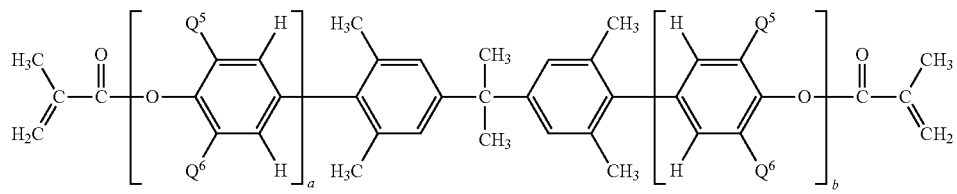

wherein each occurrence of $Q^5$ and $Q^6$ is independently methyl or di-n-butylaminomethyl; and a and b are independently 0 to 20, provided that the sum of a and b is at least 2.

Embodiment 10

The method of any of the foregoing embodiments, wherein the capping agent is (meth)acrylic anhydride, the capping byproduct is (meth)acrylic acid, the capping catalyst is 4-(N,N-dimethylamino)pyridine, and the poly(phenylene ether) solvent is toluene.

Embodiment 11

The method of any of the foregoing embodiments, wherein the capped poly(phenylene ether) is the product of reacting a poly(phenylene ether) with a capping agent in the presence of poly(phenylene ether) solvent and a capping catalyst; wherein the poly(phenylene ether) is the product of oxidatively copolymerizing monomers comprising 2,6-xylenol and 2,2-bis(3,5-dimethyl-4-hydroxyphenyl)propane; wherein the capping agent is (meth)acrylic anhydride; wherein the mole ratio of (meth)acrylic anhydride to hydroxy groups on the poly(phenylene ether) is 1 to 3; wherein the poly(phenylene ether) solvent is toluene; wherein the capping catalyst is 4-(N,N-dimethylamino)pyridine; and wherein the capping byproduct is (meth)acrylic acid.

Embodiment 12

The method of any of the foregoing embodiments, wherein the poly(phenylene ether) solvent comprises toluene.

Embodiment 13

The method of any of the foregoing embodiments, wherein the C1-C4 alkanol comprises methanol, isopropanol, or a combination thereof.

Embodiment 14

The method of any of the foregoing embodiments, wherein the water is deionized water having a conductivity of 0.05 to 5 microsiemens per centimeter, measured according to ASTM D1193-91 at 25° C.

Embodiment 15

The method of any of the foregoing embodiments, wherein the poly(phenylene ether) capping reaction mixture comprises 0.1 to 1 weight percent capping agent, 0.1 to 5 weight percent capping agent byproduct, and 0.01 to 1 weight percent capping catalyst, based on the total weight of the poly(phenylene ether) capping reaction mixture.

Embodiment 16

The method of embodiment 1, wherein the poly(phenylene ether) solvent is toluene, the C1-C4 alkanol is methanol, the capped poly(phenylene ether) is the product of reacting a poly(phenylene ether) with the capping agent in the presence of toluene and the capping catalyst, and the first liquid phase and the second liquid phase are present in a volume ratio of 2:1 to 7:1.

Embodiment 16a

A method of purifying a capped poly(phenylene ether), comprising: mixing a capped poly(phenylene ether) solution comprising a capped poly(phenylene ether), a capping agent, a capping byproduct, a capping catalyst, and toluene, and first washing solvents comprising methanol and water to form a first liquid phase comprising the capped poly(phenylene ether) and toluene, and a second liquid phase comprising methanol and water; and separating the first liquid phase from the second liquid phase; wherein the capped poly(phenylene ether) is the product of reacting a poly(phenylene ether) with the capping agent in the presence of toluene and the capping catalyst; wherein the first liquid phase and the second liquid phase are present in a volume ratio of 2:1 to 7:1; wherein the first and second liquid phases combined comprise, based on 100 mole percent total of the toluene, methanol, and water: 24 to 92 mole percent toluene, 1 to 56 mole percent methanol, and 3 to 74 mole percent water; and wherein the first liquid phase comprises at least 95 weight percent of the capped poly(phenylene ether) in solution.

Embodiment 17

The method of embodiment 16, wherein the total amount of methanol and water in the first and second liquid phases combined is at least 25 mole percent, based on 100 mole percent total of the toluene, methanol, and water.

Embodiment 18

The method of embodiment 16 or 17, wherein the methanol and water are present in a mole ratio of 0.75 to 3.

Embodiment 19

The method of any of embodiments 16-18, wherein the toluene and the combination of methanol and water are present in a mole ratio of 0.5 to 3.

Embodiment 20

The method of embodiment 1, wherein: the capping agent is (meth)acrylic anhydride; the capping byproduct is (meth)acrylic acid; the capping catalyst is 4-(N,N-dimethylamino)pyridine; the poly(phenylene ether) solvent is toluene; the C1-C4 alkanol is methanol; the capped poly(phenylene ether) is the product of reacting a poly(phenylene ether) with the (meth)acrylic anhydride in the presence of toluene and the 4-(N,N-dimethylamino)pyridine; the poly(phenylene ether) is the product of oxidatively copolymerizing monomers comprising 2,6-xylenol and 2,2-bis(3,5-dimethyl-4-hydroxyphenyl)propane, wherein the molar ratio of (meth)acrylic anhydride to hydroxy groups on the poly(phenylene ether) is 1 to 3; the first liquid phase and the second liquid phase are present in a volume ratio of 2:1 to 7:1; the total amount of the methanol and water in the first and second liquid phases combined is at least 25 mole percent, based on 100 mole percent total of the toluene, methanol, and water; the toluene and the combination of methanol and water are present in a mole ratio of 0.75 to 3; and the methanol and water are present in a mole ratio of 0.5 to 3.

Embodiment 20a

A method of purifying a capped poly(phenylene ether), comprising: mixing a capped poly(phenylene ether) solution comprising a capped poly(phenylene ether), (meth)acrylic anhydride, (meth)acrylic acid, 4-(N,N-dimethylamino)pyridine, and toluene, and first washing solvents comprising methanol and water to form a first liquid phase comprising the capped poly(phenylene ether) and toluene, and a second liquid phase comprising methanol and water; and separating the first liquid phase from the second liquid phase; wherein the capped poly(phenylene ether) is the product of reacting a poly(phenylene ether) with (meth)acrylic anhydride in the presence of toluene and 4-(N,N-dimethylamino)pyridine, wherein the mole ratio of (meth)acrylic anhydride to hydroxy groups on the poly(phenylene ether) is 1 to 3; wherein the poly(phenylene ether) is the product of oxidatively copolymerizing monomers comprising 2,6-xylenol and 2,2-bis(3,5-dimethyl-4-hydroxyphenyl)propane; wherein the first liquid phase and the second liquid phase are present in a volume ratio of 2:1 to 7:1; wherein the first and second liquid phases combined comprise, based on 100 mole percent total of the toluene, methanol, and water: 24 to 92 mole percent toluene, 1 to 56 mole percent methanol, and 3 to 73 mole percent water; wherein the total amount of the methanol and water in the first and second liquid phases combined is at least 25 mole percent, based on 100 mole percent total of the toluene, methanol, and water; wherein the toluene and the combination of methanol and water are present in a mole ratio of 0.75 to 3; wherein the methanol and water are present in a mole ratio of 0.5 to 3; and wherein the first liquid phase comprises at least 95 weight percent of the capped poly(phenylene ether) in solution.

The invention is further illustrated by the following non-limiting examples.

EXAMPLES

A methacryloyl-capped poly(phenylene ether) reaction mixture after the capping reaction comprises capped poly(phenylene ether) (PPE), methacrylic anhydride (MAA), methacrylic acid (MAOH), and 4-(N,N-dimethylamino)pyridine (DMAP), as described in U.S. Pat. No. 7,595,367 to Carrillo et al., column 3, line 65 to column 4, line 12. Solutions of capped PPE, MAA, MAOH, and DMAP in toluene were prepared to simulate this reaction mixture. Centrifuge bottles having a volume of 50 milliliters (Corning, 430828) were used for mixing the PPE solution with a washing solution consisting of toluene, methanol and water. The water used in the Examples and Comparative Examples was deionized water. The relative amounts of toluene, methanol, and water in the wash solution, and the amount of wash solution, were adjusted with the objective of providing a two-phase mixture comprising a PPE-rich toluene phase and a methanol-water phase. The PPE and methanol-water solutions need to be maintained at 60-70° C. prior to mixing, during mixing and separation, and after separation, in order for the PPE to remain completely dissolved in the toluene, and to maintain a suitable solution viscosity. The temperature was maintained by immersion of the samples in a water bath (ISOTEMP) containing a thermocouple connected to temperature controller (DIGI-SENSE TEMPERATURE CONTROLLER) to maintain the desired temperature. The PPE solution and methanol-water solution were mixed thoroughly for at least 15 minutes at ambient temperature in a wrist-action shaker, and then transferred to the 50-milliliter centrifuge bottle. For examples in which the PPE phase was less dense than the methanol-water phase, the mixture was centrifuged at 3000 revolutions per minute for 30 minutes in an IEC CLINICAL CENTRIFUGE (International Equipment Company) to separate the phases. When the PPE phase was more dense than the methanol-water phase, the mixture was allowed to gravitationally phase separate. Once the phases were separated, the PPE phase was removed from the methanol-water phase by pipette. 15 milliliters of the separated PPE and methanol-water phases were transferred to aluminum trays and dried overnight in a vacuum oven at 115° C. Control experiments indicated that less than 1 weight percent of MAA, MAOH, and DMAP are lost to evaporation under these drying conditions. The concentrations of MAA, MAOH, and DMAP in the dried PPE and the concentrations of toluene and methanol in the PPE phase were all measured using proton nuclear magnetic resonance ('H NMR) spectroscopy by comparison of selected absorption peak intensities. The concentrations of MAA, MAOH, and DMAP in the dried PPE in parts per million by weight were measured by integration of selected absorption peak areas. Metal content in the dried PPE was measured by inductively coupled plasma (ICP) spectroscopy. The ICP spectrometer was calibrated for the metals analyzed using a National Institute of Standards and Technology (NIST) traceable, 100 parts per million by weight, multi-element standard comprising copper. Calibration curves were generated using the following concentrations: 25 parts per billion by weight, 100 parts per billion by weight, 500 parts per billion by weight and 1000 parts per billion by weight. Prior to analysis, samples (0.1 to 0.2 grams) were digested in 6 milliliters of high purity nitric acid in a quartz vessel using a microwave digestion system, and then diluted to 50 milliliters with deionized water.

Examples 1-8 and Comparative Examples 9-12

PPE in the Light Phase, and Extraction of Impurities into the Heavy Phase

Methanol-water washing of 15 to 30 weight percent PPE solutions was investigated in Examples 1-8. The amounts of toluene, methanol, and water were such that the methanol-water phase was the heavy (bottom) phase and the PPE phase was the light (top) phase. The solvent compositions of Examples 1, 4, 5, and 8, which are the same, are depicted graphically as point 1 in the phase diagram of FIG. 1, and the solvent compositions of Examples 2, 3, 6, and 7, which are the same, are depicted graphically as point 2 in the phase diagram of FIG. 1. In Comparative Examples 9-12, 15 to 30 weight percent PPE solutions were washed with water alone. In these examples, the water phase was the heavy (bottom) phase and the PPE phase was the light (top phase). After the methanol-water or water wash, the PPE phase was separated using a laboratory centrifuge, dried, and analyzed by $^1$H NMR to determine residual levels of impurities. Material amounts and residual impurity levels are provided in Table 1. As can be seen from Table 1, the methanol-water washes of Examples 1-8 reduced the MAA and MAOH to much lower levels than the water washes of Comparative Examples 9-12. DMAP levels were comparable for Examples 1-8 and Comparative Examples 9-12.

TABLE 1

| Example No. | Ex. 1 | Ex. 2 | Ex. 3 | Ex. 4 | Ex. 5 | Ex. 6 |
|---|---|---|---|---|---|---|
| PPE Solution | | | | | | |
| PPE (g) | 30 | 30 | 25 | 25 | 45 | 45 |
| Toluene (g) | 166.43 | 166.43 | 97.03 | 97.03 | 149.65 | 149.65 |
| MAA (g) | 0.474 | 0.474 | 0.395 | 0.395 | 0.710 | 0.710 |
| MAOH (g) | 2.669 | 2.669 | 2.225 | 2.225 | 4.004 | 4.004 |
| DMAP (g) | 0.287 | 0.287 | 0.239 | 0.239 | 0.430 | 0.430 |
| PPE (wt %) | 15 | 15 | 20 | 20 | 22.5 | 22.5 |
| Aliquot Sample (g) | 30 | 25 | 30 | 30 | 30 | 25 |
| Wash Solution | | | | | | |
| Toluene (g) | 0.48 | 0.65 | 0.73 | 0.45 | 0.43 | 0.58 |
| Methanol (g) | 1.24 | 1.67 | 1.87 | 1.16 | 1.12 | 1.50 |
| Water (g) | 1.39 | 1.25 | 1.40 | 1.30 | 1.25 | 1.12 |
| Total PPE + Wash Solutions | | | | | | |
| Toluene (g) | 25.45 | 21.45 | 24.01 | 23.74 | 22.88 | 19.29 |
| Methanol (g) | 1.24 | 1.67 | 1.87 | 1.16 | 1.12 | 1.50 |
| Water (g) | 1.39 | 1.25 | 1.40 | 1.30 | 1.25 | 1.12 |
| Toluene (mole %) | 70 | 65 | 65 | 70 | 70 | 65 |
| Methanol (mole %) | 10 | 15 | 15 | 10 | 10 | 15 |
| Water (mole %) | 20 | 20 | 20 | 20 | 20 | 20 |
| Toluene (wt %) | 90.62 | 88.02 | 88.02 | 90.62 | 90.62 | 88.02 |
| Methanol (wt %) | 4.42 | 6.85 | 6.85 | 4.42 | 4.42 | 6.85 |
| Water (wt %) | 4.96 | 5.13 | 5.13 | 4.96 | 4.96 | 5.13 |
| Dried Powder | | | | | | |
| MAA (ppm) | 814 | 861 | 742 | 767 | 625 | 819 |
| MAOH (ppm) | 3186 | 1826 | 2890 | 1977 | 2065 | 2238 |
| DMAP (ppm) | 860 | 452 | 888 | 626 | 586 | 667 |

| | Ex. 7 | Ex. 8 | C. Ex. 9 | C. Ex. 10 | C. Ex. 11 | C. Ex. 12 |
|---|---|---|---|---|---|---|
| PPE Solution | | | | | | |
| PPE (g) | 37.6 | 37.6 | 3.3 | 4.4 | 5 | 6 |
| Toluene (g) | 83.26 | 83.26 | 18.31 | 17.08 | 16.63 | 13.29 |
| MAA (g) | 0.592 | 0.592 | 0.052 | 0.069 | 0.079 | 0.095 |
| MAOH (g) | 3.346 | 3.346 | 0.294 | 0.392 | 0.445 | 0.534 |
| DMAP (g) | 0.359 | 0.359 | 0.032 | 0.042 | 0.048 | 0.057 |
| PPE (wt %) | 30 | 30 | 15 | 20 | 22.5 | 30 |
| Aliquot Sample (g) | 30 | 30 | 22 | 22 | 22.22 | 20 |
| Wash Solution | | | | | | |
| Toluene (g) | 0.62 | 0.39 | — | — | — | — |
| Methanol (g) | 1.60 | 0.99 | — | — | — | — |
| Water (g) | 1.20 | 1.11 | 3.14 | 3.14 | 3.17 | 2.86 |
| Total PPE + Wash | | | | | | |
| Toluene (g) | 20.55 | 20.32 | 18.31 | 17.08 | 16.63 | 13.29 |
| Methanol (g) | 1.60 | 0.99 | — | — | — | — |
| Water (g) | 1.20 | 1.11 | 3.14 | 3.14 | 3.17 | 2.86 |
| Toluene (mole %) | 65 | 70 | — | — | — | — |
| Methanol (mole %) | 15 | 10 | — | — | — | — |
| Water (mole %) | 20 | 20 | — | — | — | — |
| Toluene (wt %) | 88.02 | 90.62 | — | — | — | — |
| Methanol (wt %) | 6.85 | 4.42 | — | — | — | — |
| Water (wt %) | 5.13 | 4.96 | — | — | — | — |
| Dried Powder | | | | | | |
| MAA (ppm) | 351 | 446 | 3838 | 3759 | 3668 | 3536 |
| MAOH (ppm) | 1947 | 2059 | 2888 | 3036 | 4513 | 6207 |
| DMAP (ppm) | 1185 | 937 | 760 | 717 | 753 | 453 |

Examples 13-17 and Comparative Examples 18-19

PPE in the Heavy Phase and Extraction of Impurities into the Light Phase

Methanol-water washing of 20 and 30 weight percent PPE solutions was investigated in Examples 13-17. The amounts of toluene, methanol, and water were such that the PPE phase was the heavy (bottom) phase and the methanol-water phase was the light (top) phase. In the phase diagram of FIG. 1, the solvent composition of Example 13 is depicted graphically as point 3, the solvent compositions of Examples 15 and 16, which are the same, are depicted graphically as point 4, and the solvent compositions of Examples 14 and 17, which are the same, are depicted graphically as point 5. In Comparative Examples 18 and 19, 20 and 30 weight percent PPE solutions were washed with water alone. After the methanol-water or water wash, the PPE phase was separated by gravity, dried, and analyzed by $^1$H NMR to determine residual levels of impurities. Material amounts and residual impurity levels are provided in Table 2. As can be seen from Table 2, the methanol-water washes of Examples 13-17 reduced the MAA and MAOH to much lower levels than the water washes of Comparative Examples 18-19. DMAP levels were comparable for Examples 13-17 and Comparative Examples 18-19.

TABLE 2

|  | Ex. 13 | Ex. 14 | Ex. 15 | Ex. 16 | Ex. 17 | C. Ex. 18 | C. Ex. 19 |
|---|---|---|---|---|---|---|---|
| PPE Solution | | | | | | | |
| PPE (g) | 12.6 | 12.6 | 25 | 37.6 | 37.6 | 4.4 | 6 |
| Toluene (g) | 48.90 | 48.90 | 97.03 | 83.26 | 83.26 | 17.08 | 13.29 |
| MAA (g) | 0.199 | 0.199 | 0.395 | 0.592 | 0.592 | 0.069 | 0.095 |
| MAOH (g) | 1.121 | 1.121 | 2.225 | 3.338 | 3.338 | 0.392 | 0.534 |
| DMAP (g) | 0.120 | 0.120 | 0.239 | 0.358 | 0.358 | 0.042 | 0.057 |
| PPE (wt %) | 20 | 20 | 20 | 30 | 30 | 20 | 30 |
| Aliquot Sample (g) | 20 | 20 | 25 | 25 | 25 | 22 | 20 |
| Wash Solution | | | | | | | |
| Toluene (g) | 1.12 | 1.95 | 1.57 | 1.35 | 2.09 | — | — |
| Methanol (g) | 2.89 | 5.02 | 4.05 | 3.47 | 5.37 | — | — |
| Water (g) | 0.76 | 1.20 | 1.52 | 1.30 | 1.28 | 3.14 | 2.86 |
| Total PPE + Wash Solutions | | | | | | | |
| Toluene (g) | 16.65 | 17.48 | 20.98 | 17.96 | 18.70 | 17.08 | 13.29 |
| Methanol (g) | 2.89 | 5.02 | 4.05 | 3.47 | 5.37 | — | — |
| Water (g) | 0.76 | 1.20 | 1.52 | 1.30 | 1.28 | 3.14 | 2.86 |
| Toluene (mole %) | 56 | 43 | 50 | 50 | 43 | — | — |
| Methanol (mole %) | 30 | 40 | 30 | 30 | 40 | — | — |
| Water (mole %) | 14 | 17 | 20 | 20 | 17 | — | — |
| Toluene (wt %) | 82.01 | 73.75 | 79.04 | 79.04 | 73.75 | — | — |
| Methanol (wt %) | 14.25 | 21.19 | 15.25 | 15.25 | 21.19 | — | — |
| Water (wt %) | 3.74 | 5.06 | 5.71 | 5.71 | 5.06 | — | — |
| Dried Powder | | | | | | | |
| MAA (ppm) | 199 | 492 | 434 | 311 | 434 | 3759 | 3536 |
| MAOH (ppm) | 2452 | 2118 | 2104 | 2079 | 1974 | 3036 | 6207 |
| DMAP (ppm) | 552 | 1104 | 702 | 1419 | 1149 | 717 | 453 |

Examples 22, 25 and 28, and Comparative Examples 20, 21, 23, 24, 26 and 27

Effect of Methanol-Water Wash on Metals Content of PPE and Comparison with Caustic Wash Methanol-water washing of 15 to 30 weight percent PPE solutions in Examples 22, 25, and 28 was compared to caustic washing of 15 to 30 weight percent PPE solutions in Comparative Examples 20, 21, 23, 24, 26 and 27. For the caustic wash, the ratio of PPE solution to caustic wash by weight was adjusted to 7:1. 10 Normal sodium hydroxide was used to prepare the caustic washes. The amount of 10 Normal sodium hydroxide was adjusted to provide 1.5 or 2 molar equivalents of hydroxide ion per mole of MAA and 0.75 to 1 molar equivalent of hydroxide ion per mole of MAOH in the PPE solutions. After the methanol-water or caustic wash, the PPE phase was separated, dried, and analyzed by ICP spectroscopy to determine residual metal levels. Material amounts and residual metal levels are provided in Table 3. Caustic washing adversely affects the purity of the PPE. As can be seen from Comparative Examples 20, 21, 23, 24, 26, and 27 in Table 3, a caustic wash, which has sodium hydroxide, introduces unacceptably high levels of sodium ions into the dried PPE. In contrast, no sodium ions were detected for Examples 22, 25, and 28, which used methanol-water washes instead of caustic washes.

TABLE 3

|  | C. Ex. 20 | C. Ex. 21 | Ex. 22 | C. Ex. 23 | C. Ex. 24 | Ex. 25 | C. Ex. 26 | C. Ex. 27 | Ex. 28 |
|---|---|---|---|---|---|---|---|---|---|
| PPE Solution |  |  |  |  |  |  |  |  |  |
| PPE (g) | 25 | 25 | 25 | 30 | 30 | 25 | 30 | 30 | 25 |
| Toluene (g) | 138.70 | 138.70 | 138.70 | 99.77 | 99.77 | 83.14 | 66.43 | 66.43 | 55.36 |
| MAA (g) | 0.395 | 0.395 | 0.31 | 0.474 | 0.474 | 0.31 | 0.47 | 0.47 | 0.31 |
| MAOH (g) | 2.225 | 2.225 | 2.21 | 2.669 | 2.669 | 2.21 | 2.67 | 2.67 | 2.21 |
| DMAP (g) | 0.239 | 0.239 | 0.16 | 0.387 | 0.387 | 0.16 | 0.29 | 0.29 | 0.16 |
| PPE (wt %) | 15 | 15 | 15 | 22.5 | 22.5 | 22.5 | 30 | 30 | 30 |
| Aliquot Sample (g) | 30 | 30 | 30 | 30 | 30 | 30 | 23 | 23 | 20 |
| Wash Solution |  |  |  |  |  |  |  |  |  |
| Toluene (g) | — | — | 0.48 | — | — | 0.43 | — | — | 0.26 |
| Methanol (g) | — | — | 1.24 | — | — | 1.12 | — | — | 0.66 |
| Water (g) | 3.70 | 3.51 | 1.39 | 3.41 | 3.12 | 1.25 | 2.39 | 2.09 | 0.74 |
| Sodium Hydroxide (g) | 0.58 | 0.78 | — | 0.88 | 1.17 | — | 0.90 | 1.19 | — |
| Sodium Hydroxide in aqueous phase (wt %) | 4.09 | 5.45 | — | 6.13 | 8.18 | — | 8.18 | 10.90 | — |
| Total PPE + Wash Solutions |  |  |  |  |  |  |  |  |  |
| Toluene (g) | 24.97 | 24.97 | 25.45 | 22.45 | 22.45 | 22.88 | 15.28 | 15.28 | 13.55 |
| Methanol (g) | — | — | 1.24 | — | — | 1.12 | — | — | 0.66 |
| Water (g) | 3.70 | 3.51 | 1.39 | 3.41 | 3.12 | 1.25 | 2.39 | 2.09 | 0.74 |
| Sodium Hydroxide (g) | 0.58 | 0.78 | — | 0.88 | 1.17 | — | 0.90 | 1.19 | — |
| Toluene (mole %) |  |  | 70 |  |  | 70 |  |  | 70 |
| Methanol (mole %) | — | — | 10 | — | — | 10 | — | — | 10 |
| Water (mole %) |  |  | 20 |  |  | 20 |  |  | 20 |
| Toluene (wt %) |  |  | 90.62 |  |  | 90.62 |  |  | 90.62 |
| Methanol (wt %) | — | — | 4.42 | — | — | 4.42 | — | — | 4.42 |
| Water (wt %) |  |  | 4.96 |  |  | 4.96 |  |  | 4.96 |
| Dried Powder |  |  |  |  |  |  |  |  |  |
| Na (ppm) | 25.9 | 41.4 | 0 | 296 | 167 | 0 | 1290 | 696 | 0 |
| Fe (ppm) | 0.8 | 1 | 0.1 | 0.5 | 0 | 0.1 | 0.6 | 0.6 | 0 |
| Cu (ppm) | 4.1 | 3.3 | 2.1 | 4.3 | 2.8 | 1.8 | 4.5 | 2.8 | 1.2 |
| Cr (ppm) | 0.1 | 0 | 0 | 0 | 0 | 0 | 0 | 0 | 0.1 |

Examples 32-34 and Comparative Examples 29-31

Effect of Purification Method on the Amount of Solvent Used Per Gram of PPE in Solution Precipitation Versus Methanol-Water Wash Methanol-water washing of 15 to 30 weight percent PPE solutions in Examples 32-34 was compared to isopropyl alcohol precipitation of 48.8 weight percent PPE solutions in Comparative Examples 29-31. The separated PPE phase after the methanol-water wash, and the PPE after precipitation, were dried and analyzed by $^1$H NMR to determine residual levels of impurities. Material amounts and residual impurity levels are provided in Table 4. As can be seen from Table 4, far less total solvent is used in methanol-water washing than in isopropyl alcohol precipitation, especially for the 22.5 to 30 weight percent PPE solutions of Examples 33 and 34. As can be seen from Examples 32-34, having 15, 22.5, and 30 weight percent PPE, respectively, in the PPE solutions after dilution with different amounts of additional toluene, the higher the concentration of PPE in the solution, the lower the solvent to PPE ratio. The total amount of residual MAA and MAOH in the isolated PPE from the two processes is comparable. However, a much reduced level of DMAP is obtained in the methanol-water wash method compared to the precipitation method. Consequently, overall, the methanol-water wash method is more effective than the precipitation method in purification of PPE.

TABLE 4

|  | C. Ex. 29 | C. Ex. 30 | C. Ex. 31 | Ex. 32 | Ex. 33 | Ex. 34 |
|---|---|---|---|---|---|---|
| PPE Solution |  |  |  |  |  |  |
| PPE (g) | 151.48 | 112.39 | 87.95 | 30 | 45 | 37.6 |
| Toluene (g) | 139.59 | 103.56 | 81.05 | 27.91 | 41.86 | 34.98 |
| MAA (g) | 2.68 | 1.99 | 1.55 | 0.474 | 0.710 | 0.593 |
| MAOH (g) | 14.66 | 10.87 | 8.51 | 2.669 | 4.004 | 3.346 |
| DMAP (g) | 1.57 | 1.17 | 0.91 | 0.287 | 0.430 | 0.359 |
| PPE (wt %) | 48.8 | 48.8 | 48.8 | 48.8 | 48.8 | 48.8 |
| Purification Method |  |  |  |  |  |  |
| Precipitation | ✓ | ✓ | ✓ | — | — | — |
| Methanol-Water wash | — | — | — | ✓ | ✓ | ✓ |

TABLE 4-continued

|  | C. Ex. 29 | C. Ex. 30 | C. Ex. 31 | Ex. 32 | Ex. 33 | Ex. 34 |
|---|---|---|---|---|---|---|
| Additional Solvent for Dilution | | | | | | |
| Toluene (g) | — | — | — | 138.52 | 107.79 | 48.28 |
| Aliquot | | | | | | |
| Sample (g) | 310 | 230 | 180 | 30 | 25 | 30 |
| PPE (w/w %) | 48.8 | 48.8 | 48.8 | 15 | 22.5 | 30 |
| Additional Solvent | | | | | | |
| Toluene (g) | — | — | — | 0.48 | 0.43 | 0.39 |
| Isopropyl Alcohol (g) | 1171.11 | 1303.33 | 1360 | — | — | — |
| Methanol (g) | — | — | — | 1.24 | 1.12 | 0.99 |
| Water (g) | — | — | — | 1.39 | 1.25 | 1.11 |
| Aliquot Solution + Additional Solvent | | | | | | |
| Toluene (g) | 139.59 | 103.56 | 81.05 | 25.45 | 22.88 | 20.32 |
| Isopropyl Alcohol (g) | 1171.11 | 1303.33 | 1360 | — | — | — |
| Methanol (g) | — | — | — | 1.24 | 1.12 | 0.99 |
| Water (g) | — | — | — | 1.39 | 1.25 | 1.11 |
| Dried Powder | | | | | | |
| MAA (ppm) | 601 | 459 | 597 | 814 | 819 | 446 |
| MAOH (ppm) | 2591 | 2306 | 2737 | 3186 | 2238 | 2059 |
| DMAP (ppm) | 6681 | 5399 | 6040 | 860 | 667 | 937 |
| Total Grams of Solvent Per Gram of PPE in Solution | 8.652 | 12.51 | 16.38 | 6.24 | 4.48 | 2.49 |

Examples 35-38

Effect of Two Washes: PPE in the Light Phase and Extraction of Impurities into the Heavy Phase Sequential methanol-water washing of 15 to 25 weight percent PPE solutions was investigated in Examples 35-38. The amounts of toluene, methanol, and water were such that the methanol-water phase was the heavy (bottom) phase and the PPE phase was the light (top) phase. Approximately 30 milliliters of PPE phase was separated after the first methanol-water wash. The separated PPE phases, after each of the first and second methanol-water washes, were dried and analyzed by $^1$H NMR to determine residual levels of impurities. Material amounts and residual impurity levels are provided in Table 5. The total amount of residual MAA, MAOH, and DMAP in isolated PPE after two methanol-water washes was slightly reduced slightly compared to isolated PPE after one methanol-water wash. These data show that further small reductions in impurity amounts can be obtained by conducting a second methanol-water wash.

TABLE 5

|  | Ex. 35 | Ex. 36 | Ex. 37 | Ex. 38 |
|---|---|---|---|---|
| PPE Solution | | | | |
| PPE (g) | 15 | 15 | 16.5 | 25 |
| Toluene (g) | 83.22 | 83.22 | 64.04 | 72.03 |
| MAA (g) | 0.237 | 0.237 | 0.260 | 0.395 |
| MAOH (g) | 1.335 | 1.335 | 1.468 | 2.225 |
| DMAP (g) | 0.143 | 0.143 | 0.158 | 0.239 |
| PPE (wt %) | 15 | 15 | 20 | 25 |
| Wash 1 | | | | |
| Aliquot Sample (g) | 40 | 40 | 45 | 40 |
| Wash Solution 1 | | | | |
| Toluene (g) | 0.64 | 1.04 | 0.67 | 0.56 |
| Methanol (g) | 1.65 | 2.67 | 1.74 | 1.43 |
| Water (g) | 1.86 | 2.00 | 1.95 | 1.61 |
| Total PPE + Wash 1 | | | | |
| Toluene (g) | 33.93 | 34.33 | 35.61 | 29.37 |
| Methanol (g) | 1.65 | 2.67 | 1.49 | 1.43 |
| Water (g) | 1.86 | 2.00 | 1.67 | 1.61 |
| Toluene (mole %) | 70 | 65 | 70 | 70 |
| Methanol (mole %) | 10 | 15 | 10 | 10 |
| Water (mole %) | 20 | 20 | 20 | 20 |
| Toluene (wt %) | 90.62 | 88.02 | 90.62 | 90.62 |
| Methanol (wt %) | 4.42 | 6.84 | 4.42 | 4.42 |
| Water (wt %) | 4.96 | 5.13 | 4.96 | 4.96 |
| Wash 2 | | | | |
| Aliquot Sample (g) | 30 | 30 | 30 | 30 |
| Wash Solution 2 | | | | |
| Toluene (g) | 0.48 | 0.78 | 0.45 | 0.42 |
| Methanol (g) | 1.24 | 2.00 | 1.16 | 1.07 |
| Water (g) | 1.39 | 1.50 | 1.30 | 1.21 |
| Total PPE + Wash 2 | | | | |
| Toluene (g) | 25.45 | 25.74 | 23.74 | 22.03 |
| Methanol (g) | 1.24 | 2.00 | 1.16 | 1.07 |
| Water (g) | 1.39 | 1.50 | 1.30 | 1.21 |
| Toluene (mole %) | 70 | 65 | 70 | 70 |
| Methanol (mole %) | 10 | 15 | 10 | 10 |
| Water (mole %) | 20 | 20 | 20 | 20 |
| Toluene (wt %) | 90.62 | 88.02 | 90.62 | 90.62 |
| Methanol (wt %) | 4.42 | 6.84 | 4.42 | 4.42 |
| Water (wt %) | 4.96 | 5.13 | 4.96 | 4.96 |

TABLE 5-continued

|  | Ex. 35 | Ex. 36 | Ex. 37 | Ex. 38 |
| --- | --- | --- | --- | --- |
| Dried Powder (After Wash 1) | | | | |
| MAA (ppm) | 1889 | 1461 | 1266 | 1566 |
| MAOH (ppm) | 2174 | 2056 | 2339 | 2279 |
| DMAP (ppm) | 734 | 836 | 718 | 745 |
| Dried Powder (After Wash 2) | | | | |
| MAA (ppm) | 1445 | 1595 | 1185 | 1475 |
| MAOH (ppm) | 2035 | 1913 | 2179 | 2165 |
| DMAP (ppm) | 585 | 665 | 707 | 628 |

Examples 39 and 40

Evaluation of Isopropyl Alcohol-Water Wash

In these Examples, the feasibility of using an isopropyl alcohol-water wash instead of a methanol-water wash was investigated. PPE solutions at 15 and 20 weight percent solids were evaluated. It was found that like methanol-water solutions, isopropyl alcohol-water solutions phase separate from PPE solutions in toluene. A toluene-isopropyl alcohol-water mole ratio of 70:10:20 was selected so that the PPE phase was the light phase and the isopropyl alcohol-water phase was the heavy phase. After the isopropanol-water wash, the PPE phase was separated, dried, and analyzed by $^1$H NMR to determine residual levels of impurities. Material amounts and residual impurity levels are provided in Table 6. The residual concentrations of MAA, MAOH, and DMAP in the dried PPE of Examples 39 and 40 are similar to the residual concentrations obtained in the methanol-water wash method. These results demonstrate the feasibility of using an isopropyl alcohol-water wash.

TABLE 6

|  | Ex. 39 | Ex. 40 |
| --- | --- | --- |
| PPE Solution | | |
| PPE Solution (g) | 9.5 | 13 |
| Dilution Toluene (g) | 20.24 | 17.52 |
| Solids (wt %) | 15 | 20 |
| Aliquot Sample (g) | 29.74 | 30.52 |
| Wash Solution | | |
| IPA (g) | 2.30 | 2.21 |
| Water (g) | 1.38 | 1.32 |
| Total PPE + Wash | | |
| Toluene (g) | 24.73 | 23.67 |
| IPA (g) | 2.30 | 2.21 |
| Water (g) | 1.38 | 1.32 |
| Toluene (mole %) | 70 | 70 |
| IPA (mole %) | 10 | 10 |
| Water (mole %) | 20 | 20 |
| Toluene (wt %) | 87.03 | 87.03 |
| IPA (wt %) | 8.11 | 8.11 |
| Water (wt %) | 4.86 | 4.86 |
| Dried Powder | | |
| MAA (ppm) | 724 | 689 |
| MAOH (ppm) | 3121 | 3120 |
| DMAP (ppm) | 1016 | 939 |

The invention claimed is:

1. A method of purifying a capped poly(phenylene ether), comprising:
   mixing
      a capped poly(phenylene ether) solution comprising a capped poly(phenylene ether), a capping agent, a capping byproduct, a capping catalyst, and a poly(phenylene ether) solvent selected from the group consisting of toluene, xylenes, mesitylene, styrene, chlorobenzene, dichlorobenzenes, chloroform, and combinations thereof, and
      first washing solvents comprising a C1-C4 alkanol and water to form
      a first liquid phase comprising the capped poly(phenylene ether) and poly(phenylene ether) solvent, and
      a second liquid phase comprising C1-C4 alkanol and water; and
   separating the first liquid phase from the second liquid phase;
   wherein the first liquid phase and the second liquid phase are present in a volume ratio of 1.5:1 to 10:1;
   wherein the first and second liquid phases combined comprise, based on 100 mole percent total of the poly(phenylene ether) solvent, C1-C4 alcohol, and water:
      24 to 92 mole percent poly(phenylene ether) solvent,
      1 to 56 mole percent C1-C4 alkanol, and
      3 to 74 mole percent water; and
   wherein the first liquid phase comprises at least 95 weight percent of the capped poly(phenylene ether) in solution.

2. The method of claim 1, wherein the total amount of C1-C4 alkanol and water in the first and second liquid phases combined is at least 25 mole percent, based on 100 mole percent total of the poly(phenylene ether) solvent, C1-C4 alkanol, and water.

3. The method of claim 1, wherein the poly(phenylene ether) solvent and the combination of C1-C4 alkanol and water are present in a mole ratio of 0.75 to 3.

4. The method of claim 1, wherein the C1-C4 alkanol and water are present in a mole ratio of 0.5 to 3.

5. The method of claim 1, wherein the first washing solvents further comprise poly(phenylene ether) solvent.

6. The method of claim 1, wherein less than 10 parts per million by weight of a chelating agent, based on the total weight of the first washing solvents, is dissolved in the first washing solvents.

7. The method of claim 1, wherein the capped poly(phenylene ether) has the structure $$Q(J-X)_u$$

wherein Q has the structure

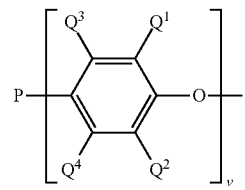

wherein $Q^1$ and $Q^2$ are independently selected from the group consisting of halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; $Q^3$ and $Q^4$ are independently selected from the group consisting of hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; u and v are 1 to 100, provided that u equals v;

P is hydrogen, unsubstituted or substituted $C_1$-$C_{18}$ hydrocarbyl, or when v is 2, has the structure

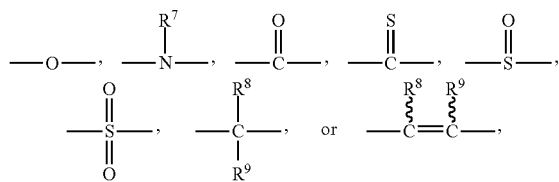

wherein $R^7$ is selected from the group consisting of hydrogen and $C_1$-$C_{12}$ hydrocarbyl, and each occurrence of $R^8$ and $R^9$ is independently selected from the group consisting of hydrogen and $C_1$-$C_{12}$ hydrocarbyl, or wherein $R^8$ and $R^9$ collectively form a $C_4$-$C_{12}$ hydrocarbylene group;

J comprises repeat units having the structure

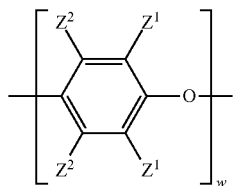

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and w is 1 to 200; and X has the structure

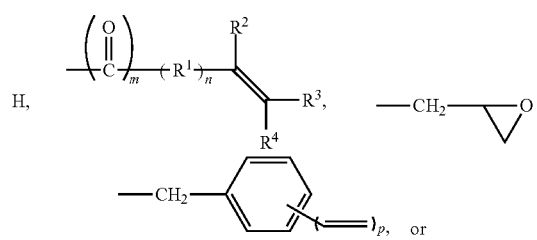

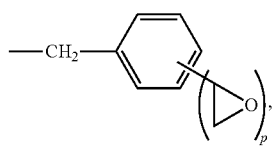

wherein $R^1$ is $C_1$-$C_{12}$ hydrocarbylene; $R^2$, $R^3$, and $R^4$ are independently hydrogen or $C_1$-$C_{18}$ hydrocarbyl; m is 0 or 1; n is 0 or 1; and each occurrence of p is independently 0, 1, 2, or 3.

8. The method of claim 1, wherein the capped poly(phenylene ether) comprises a bifunctional poly(phenylene ether) having the structure

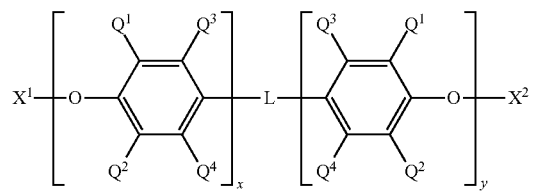

wherein each occurrence of $Q^1$ and $Q^2$ is independently selected from the group consisting of halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; and x and y are independently 0 to 100, provided that the sum of x and y is at least 2;

L has the structure

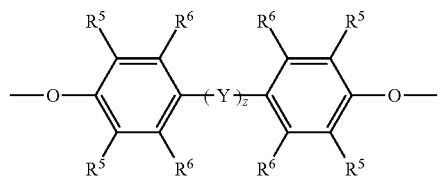

wherein each occurrence of $R^5$ and $R^6$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; Y has the structure

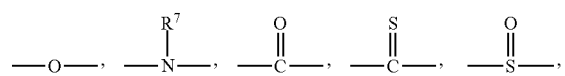

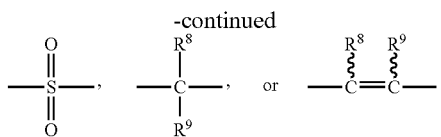

wherein $R^7$ is selected from the group consisting of hydrogen and $C_1$-$C_{12}$ hydrocarbyl, and each occurrence of $R^8$ and $R^9$ is independently selected from the group consisting of hydrogen and $C_1$-$C_{12}$ hydrocarbyl, or wherein $R^8$ and $R^9$ collectively form a $C_4$-$C_{12}$ hydrocarbylene group; and z is 0 or 1; and $X^1$ and $X^2$ are independently

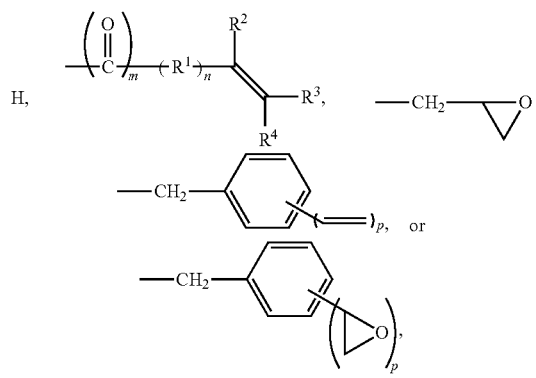

wherein $R^1$ is $C_1$-$C_{12}$ hydrocarbylene; $R^2$, $R^3$, and $R^4$ are independently hydrogen or $C_1$-$C_{18}$ hydrocarbyl; m is 0 or 1; n is 0 or 1; and each occurrence of p is independently 0, 1, 2, or 3, provided that both $X^1$ and $X^2$ are not H.

9. The method of claim 1, wherein the capped poly(phenylene ether) has the structure

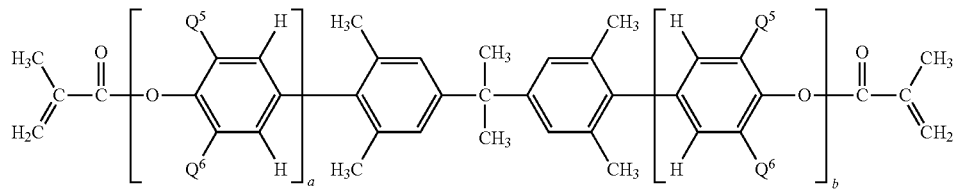

wherein each occurrence of $Q^5$ and $Q^6$ is independently methyl or di-n-butylaminomethyl; and a and b are independently 0 to 20, provided that the sum of a and b is at least 2.

10. The method of claim 1, wherein the capping agent is (meth)acrylic anhydride, the capping byproduct is (meth)acrylic acid, the capping catalyst is 4-(N,N-dimethylamino) pyridine, and the poly(phenylene ether) solvent is toluene.

11. The method of claim 1, wherein the capped poly(phenylene ether) is the product of reacting a poly(phenylene ether) with a capping agent in the presence of poly(phenylene ether) solvent and a capping catalyst; wherein the poly(phenylene ether) is the product of oxidatively copolymerizing monomers comprising 2,6-xylenol and 2,2-bis(3,5-dimethyl-4-hydroxyphenyl)propane; wherein the capping agent is (meth)acrylic anhydride; wherein the mole ratio of (meth)acrylic anhydride to hydroxy groups on the poly(phenylene ether) is 1 to 3; wherein the poly(phenylene ether) solvent is toluene; wherein the capping catalyst is 4-(N,N-dimethylamino)pyridine; and wherein the capping byproduct is (meth)acrylic acid.

12. The method of claim 1, wherein the poly(phenylene ether) solvent comprises toluene.

13. The method of claim 1, wherein the C1-C4 alkanol comprises methanol, isopropanol, or a combination thereof.

14. The method of claim 1, wherein the water is deionized water having a conductivity of 0.05 to 5 microsiemens per centimeter, measured according to ASTM D1193-91 at 25° C.

15. The method of claim 1, wherein the poly(phenylene ether) capping reaction mixture comprises 0.1 to 1 weight percent capping agent, 0.1 to 5 weight percent capping agent byproduct, and 0.01 to 1 weight percent capping catalyst, based on the total weight of the poly(phenylene ether) capping reaction mixture.

16. A method of purifying a capped poly(phenylene ether), comprising:
mixing
a capped poly(phenylene ether) solution comprising a capped poly(phenylene ether), a capping agent, a capping byproduct, a capping catalyst, and toluene, and
first washing solvents comprising methanol and water to form
a first liquid phase comprising the capped poly(phenylene ether) and toluene, and
a second liquid phase comprising methanol and water; and
separating the first liquid phase from the second liquid phase;
wherein the capped poly(phenylene ether) is the product of reacting a poly(phenylene ether) with the capping agent in the presence of toluene and the capping catalyst;
wherein the first liquid phase and the second liquid phase are present in a volume ratio of 2:1 to 7:1;
wherein the first and second liquid phases combined comprise, based on 100 mole percent total of the toluene, methanol, and water:
24 to 92 mole percent toluene,
1 to 56 mole percent methanol, and
3 to 74 mole percent water; and
wherein the first liquid phase comprises at least 95 weight percent of the capped poly(phenylene ether) in solution.

17. The method of claim 16, wherein the total amount of methanol and water in the first and second liquid phases combined is at least 25 mole percent, based on 100 mole percent total of the toluene, methanol, and water.

18. The method of claim 16, wherein the methanol and water are present in a mole ratio of 0.75 to 3.

19. The method of claim 16, wherein the toluene and the combination of methanol and water are present in a mole ratio of 0.5 to 3.

20. A method of purifying a capped poly(phenylene ether), comprising:
mixing
a capped poly(phenylene ether) solution comprising a capped poly(phenylene ether), (meth)acrylic anhydride, (meth)acrylic acid, 4-(N,N-dimethylamino)pyridine, and toluene, and
first washing solvents comprising methanol and water to form
a first liquid phase comprising the capped poly(phenylene ether) and toluene, and
a second liquid phase comprising methanol and water; and
separating the first liquid phase from the second liquid phase;
wherein the capped poly(phenylene ether) is the product of reacting a poly(phenylene ether) with (meth)acrylic anhydride in the presence of toluene and 4-(N,N-dimethylamino)pyridine, wherein the mole ratio of (meth)acrylic anhydride to hydroxy groups on the poly(phenylene ether) is 1 to 3;
wherein the poly(phenylene ether) is the product of oxidatively copolymerizing monomers comprising 2,6-xylenol and 2,2-bis(3,5-dimethyl-4-hydroxyphenyl)propane;
wherein the first liquid phase and the second liquid phase are present in a volume ratio of 2:1 to 7:1;
wherein the first and second liquid phases combined comprise, based on 100 mole percent total of the toluene, methanol, and water:
24 to 92 mole percent toluene,
1 to 56 mole percent methanol, and
3 to 73 mole percent water;
wherein the total amount of the methanol and water in the first and second liquid phases combined is at least 25 mole percent, based on 100 mole percent total of the toluene, methanol, and water;
wherein the toluene and the combination of methanol and water are present in a mole ratio of 0.75 to 3;
wherein the methanol and water are present in a mole ratio of 0.5 to 3; and
wherein the first liquid phase comprises at least 95 weight percent of the capped poly(phenylene ether) in solution.

* * * * *